(12) United States Patent
Takikawa et al.

(10) Patent No.: US 7,405,000 B2
(45) Date of Patent: Jul. 29, 2008

(54) RESIN PARTICLE AND PROCESS OF PRODUCING THE SAME

(75) Inventors: Tadao Takikawa, Kyoto (JP); Toshihiko Kinsho, Kyoto (JP); Hidetoshi Noda, Kyoto (JP); Shuhei Yahiro, Kyoto (JP); Yutaka Yoshida, Kyoto (JP); Tomoyuki Ichikawa, Numazu (JP); Satoshi Mochizuki, Numazu (JP); Yasuaki Iwamoto, Numazu (JP); Hideki Sugiura, Numazu (JP)

(73) Assignees: Sanyo Chemical Industries, Ltd, Kyoto (JP); Ricoh Company, Ltd., Tokyo (JP)

( * ) Notice: Subject to any disclaimer, the term of this patent is extended or adjusted under 35 U.S.C. 154(b) by 231 days.

(21) Appl. No.: 10/540,760

(22) PCT Filed: Jul. 14, 2004

(86) PCT No.: PCT/JP2004/010056

§ 371 (c)(1),
(2), (4) Date: Dec. 2, 2005

(87) PCT Pub. No.: WO2005/005522

PCT Pub. Date: Jan. 20, 2005

(65) Prior Publication Data

US 2006/0165989 A1     Jul. 27, 2006

(30) Foreign Application Priority Data

Jul. 14, 2003   (JP)  ............... 2003-196755

(51) Int. Cl.
*B32B 5/66*     (2006.01)
(52) U.S. Cl. .................. 428/403; 428/407; 427/384
(58) Field of Classification Search ............ 428/403, 428/407; 427/384
See application file for complete search history.

(56) References Cited

FOREIGN PATENT DOCUMENTS

JP     2001-252553    *   9/2001

* cited by examiner

*Primary Examiner*—Kiliman Leszek
(74) *Attorney, Agent, or Firm*—Edwards Angell Palmer & Dodge LLP

(57) ABSTRACT

Provided is a resin particle comprising a resin (a) and a filler (b) contained in the particle; the particle has a volume average particle diameter of from 0.1 to 300 μm and a shape factor of from 110 to 300; the particle has an outer shell layer (S) comprising at least a portion of the filler (b); the layer (S) is at least 0.01 μm thick and has a thickness that is ½ or less of the maximum inscribed circle radius of the particle cross section. When used as a toner resin, it is excellent in blade cleaning properties and wide in the fixation temperature range; when employed as a paint additive or a cosmetics additive, it is excellent in masking properties; when used as paper coating additive, it is excellent in ink retention; when utilized as an abrasive, it is excellent in abrasion.

21 Claims, 7 Drawing Sheets

RESIN PARTICLE AND PROCESS OF PRODUCING THE SAME

CROSS REFERENCE TO RELATED APPLICATION

The present application is a 35 U.S.C. §371 national application of PCT/JP2004/010056 filed Jul. 14, 2004, which is incorporated herein by reference in its entirety.

TECHNICAL FIELD

The present invention relates to resin particles, and more particularly to resin particles valuable for toners used for electrophotography, electrostatic recording, electrostatic printing, etc, paint additives, cosmetics additives, paper coating additives, abrasives, slush molding materials, hot inlet adhesives, powder paints, other molding materials, and the like.

BACKGROUND ART

Resin particles are conventionally known that are produced by dispersing, in an aqueous medium, a resin solution in which the resin was dissolved in a solvent in advance in the presence of a dispersing (assistant) agent such as a surfactant or water-soluble polymer, and then removing the solvent via heating, pressure reduction, or the like (the solution resin suspension process). The shapes of these resin particles obtained by the solution resin suspension process are difficult to be regulated, and in general they have a spherical form.

Use of the spherical particles as a paint additive or a cosmetics additive leads to insufficient masking properties in some cases. When the particles are used as a paper coating additive, the retention of ink is sometimes poor due to lack of oil absorbance. When the particles are used as an abrasive, the frictional resistance is small, thereby grinding properties are poor in some cases. The use of the particles as a toner resin poses the problem of rendering cleaning properties insufficient when the toner remaining on a photoreceptor without being transferred to a paper surface is cleaned with a blade. For solution of such problems, a process is available that involves appropriately elasticizing the surfaces of particles prior to volume shrinkage of the particles with a solvent-removing, and making smaller the surface area decreasing speed than the volume shrinking speed to form resin particles having unevenness on the surfaces. As a means of rendering the surface of a particle to be elastic is proposed a method of forming a shell material on the resin particle surface by means of interfacial polymerization or in-situ polymerization (refer to Japanese Patent Application Laid-Open No. 4-209630). This method, however, does not sufficiently exhibit properties required for the particles due to the effect of the shell material. For instance, a toner in this case causes the problem of lowering low-temperature fixing properties and anti-hot offset properties, thereby extremely narrowing the fixing temperature range.

DISCLOSURE OF THE INVENTION

Problems to be Solved by the Invention

The present invention was made in consideration of the above situations in the prior art. More specifically, the present invention is directed to the provision of a resin particle that is excellent in masking properties when being used as a paint additive or a cosmetics additive, is excellent in retention of ink when being used as a paper coating additive, is excellent in abrading properties when being used as an abrasive, is excellent in blade cleaning properties, and wide in fixing temperature range when being used as a toner resin.

Means by which to Solve the Problem

The present inventors have diligently studied to attain the above object, leading to the present invention.

In other words, the present invention includes a resin particle comprising a resin (a) and a filler (b) contained in the particle; the particle has a volume average particle diameter of from 0.1 to 300 μm and a shape factor (SF-2) of from 110 to 300; the particle has an outer shell layer (S) comprising at least a portion of the filler (b); the layer (S) having a thickness of at least 0.01 μm and the thickness being ½ or less of the radius of the maximum inscribed circle of the cross section of the particle.

In addition, the invention includes a process of producing the above resin particle; the process involves (1) dispersing in an aqueous medium (W) a filler-containing dispersion liquid (D) produced by dispersing the filler (b) in a dispersion liquid (D0) comprising the resin (a) and/or its precursor (a0) in a solvent (s), forming an oil-in-water dispersion liquid (D1), thereby forming in an oil drop (A0) an accumulated layer (S0) comprising at least a portion of the filler (b), and (2) removing the solvent of the oil-in-water dispersion liquid (D1) to obtain a resin particle (A).

EFFECT OF THE INVENTION

A resin particle of the present invention shows the following effects:
[1] excellent in masking properties.
[2] excellent in oil absorbing properties.
[3] excellent in abrasive properties when being used as an abrasive.

In particular, when the resin particle is used as a resin particle for a toner, it exhibits the following effects:
[4] good in blade cleaning properties.
[5] excellent in low-temperature fixing properties.
[6] excellent in anti-hot offset properties.

BEST MODE FOR CARRYING OUT THE INVENTION

A resin particle [hereinafter, also referred to as (A)] of the present invention includes a resin (a) and a filler (b) and has an outer shell layer (S) comprising at least a portion of the filler (b) [hereinafter, of the filler (b), a filler forming the outer shell layer (S) is also referred to as (b*)]. Inclusion of a filler (b) is indicative of the state of a filler (b) being present underneath the surface or inside the resin particle (A), and is capable of being observed by a transmission electron microscope (TEM). When a filler (b) is exposed to the outside of the resin particle (A), or is adsorbed on the surface of the resin particle (A), with respect to the surface and the bulk properties of the resin particle (A), the properties of the filler (b) are dominant, and thus the properties of a resin (a) are rarely exhibited. Conversely, when a filler (b) is contained inside the particle, the properties of a resin (a) is readily expressed. In other words, a resin (a) is present on the surface of the resin particle (A) and further also in the inside of the outer shell layer (S), as described later, formed by a filler (b*) is present a portion occupied by a resin (a), therefore the low-temperature fixing properties are good particularly when used as a toner resin particle. In addition, where a wax is contained in the resin particle (A), in thermal fixing, the wax oozes on the resin particle (A) surface from the portion occupied by the above resin (a), so the anti-hot offset property is good.

Additionally, the thickness of the outer shell layer (S) comprising at least a portion of the filler (b) formed adjacent the surface of a resin particle (A) of the present invention can be determined by image analyzing the image of the cross section of the resin particle by means of a transmission electron microscope (TEM).

Figure 1:
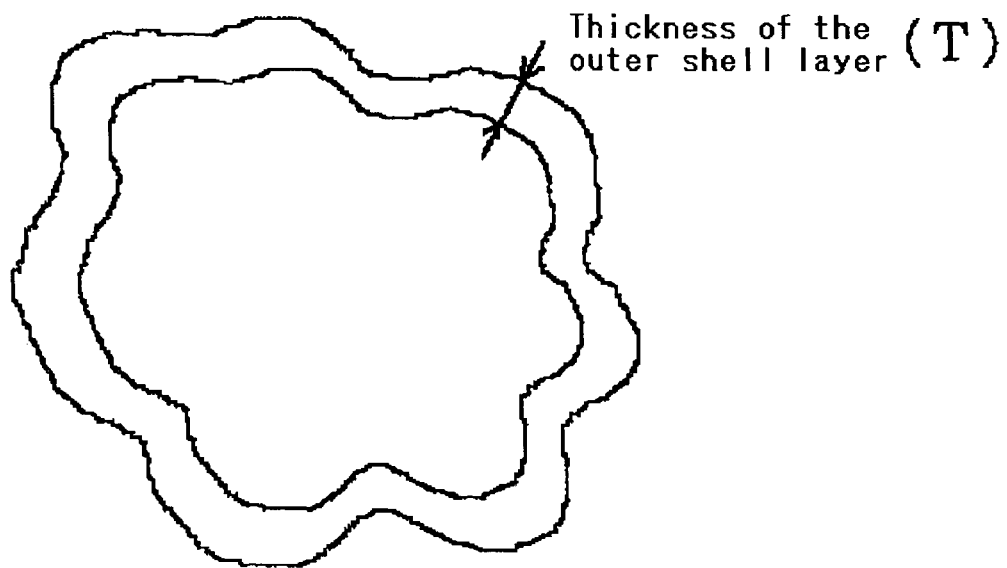
FIG. 1 is a sectional schematic diagram of a resin particle of the present invention; the particle has an outer shell layer thickness (T).

That is, the process involves dispersing resin particles in a saturated sucrose solution (67% by mass solution; % is by % by mass, unless otherwise indicated), freezing the resulting solution at −100° C., slicing it with a cryomicrotome in a thickness of about 1,000 angstroms, staining the filler (b) containing (b*) by means of ruthenium tetraoxide, and subsequently photographing the cross sections of a resin particle under a transmission electron microscope at a magnification of 10000 times to determine the thickness of the outer shell layer of a filler (b*) using an image analyzer [e.g., nexus NEW CUBE ver. 2.5 (manufactured by NEXUS), or the like]; the thickness of the outer shell layer is the maximum distance (T), where the area of a filler (b) primarily including a filler (b*) is 50% or more on an area of a portion of a thickness of a certain distance taken from the resin particle surface to a vertical direction toward the particle inside, for the cross section of the maximum cross-sectional area. Additionally, the above measurement value is an average value obtained by averaging the values of 10 resin particles randomly selected. FIG. 1 indicates an example of (T).

Moreover, distinguishing between the outer shell layer (S) and the resin (a) is difficult in the observation of a TEM image, an outer shell layer thickness (T) can be determined by mapping a resin particle cross section obtained by the above method using an apparatus escapable of composition mapping (e.g., an energy dispersive X-ray spectroscopy apparatus (EDX), an electron energy loss spectroscopy apparatus (EELS), and the like), specifying the outer shell layer (S) from the composition distribution images obtained from the analysis, and using the above method.

The lower limit of the thickness of the outer shell layer of a filler (b*) is normally 0.01 μm, preferably 0.02 μm, more preferably 0.03 μm. The upper limit of the thickness of the outer shell layer is normally ½ of the radius of the inscribed circle of a resin particle (A), preferably ⅓, more preferably ¼, most preferably ⅕. To allow the shape factor (SF-2) of the resin particle (A) to fall within the range as described later, the surface area decreasing speed needs to be extremely decreased as compared with the volume shrinking speed during volume shrinkage of the resin particle (A), and it is important to properly elasticize the resin particle surface, thereby increasing the viscosity of the resin particle surface compared to the resin particle inside. If the thickness of the outer shell layer of the filler (b*) is within the above range, the difference of viscosity between the resin particle surface and the resin particle inside is increased, readily allowing unevenness to appear on the particle surfaces.

The volume average particle diameter of a resin particle (A) is normally from 0.1 to 300 μm from the standpoint of particle diameter uniformity. The upper limit is preferably 200 μm, more preferably 100 μm, particularly preferably 75 μm, most preferably 50 μm; the lower limit is preferably 0.2 μm, more preferably 0.3 μm, particularly preferably 0.5 μm, most preferably 1 μm. If the volume average particle diameter is less than 0.1 μm, the effect of unevenness of the particle surface is decreased; if it exceeds 300 μm, the uniformity of the particle diameter is difficult.

In particular, when the resin particle is used as a toner, the volume average particle diameter of a resin particle (A) is normally from 3 to 10 μm. The upper limit is preferably 9 μm, more preferably 8 μm, particularly preferably 7 μm, most preferably 6.5 μm; the lower limit is preferably 3.5 μm, more preferably 4 μm, particularly preferably 4.2 μm, most preferably 4.5 μm. If the volume average particle diameter is 3 μm or more, the transfer to paper and blade cleaning properties are good; if it is 10 μm or less, an image with high image quality at high resolution can be obtained.

In addition, the ratio of the volume average particle diameter (Dv) to the number average particle diameter (Dn) Dv/Dn in a resin particle (A) is preferably from 1.0 to 2.0, more preferably from 1.0 to 1.9. When Dv/Dn is from 1.0 to 2.0, the powder properties such as the powder flowability, the electrostatic property, and the dustability do not have the possibility of being inhomogeneous. When the resin particle is used as a toner, Dv/Dn is preferably from 1.0 to 1.5, more preferably from 1.0 to 1.4. If Dv/Dn is from 1.0 to 1.5, the resolution is good.

In the present invention, the extent of unevenness of the surface of a resin particle (A) can be evaluated on the basis of the shape factor (SF-2), and the ratio of the center line average surface roughness to the volume average particle diameter.

The shape factor (SF-2) of a resin particle (A) is from 110 to 300. The upper limit is preferably 250, more preferably 230, particularly preferably 200; the lower limit is more preferably 115, particularly preferably 120, most preferably 125.

Additionally, the ratio of the center line surface average roughness to the volume average particle diameter, of a resin particle (A), is preferably from 0.001 to 0.1, more preferably from 0.002 to 0.08, particularly preferably from 0.002 to 0.06, most preferably from 0.003 to 0.05.

When the values are within the above ranges, the useful effects as indicated below can be obtained depending on applications of the resin particle. For instance, when the resin particles are used as a paint additive or a coating additive, or a cosmetics additive, the masking ability is increased due to an increase in light scattering effect, thereby improving the brightness and opacity. Also, when the resin particles are used as a cosmetics additive or paper coating additive, the oil absorbance and retention of oil components are improved. When the particles are used as an abrasive, the coefficient of friction of the particles is increased, thereby improving abrasion property. In addition, when the particles are used as a material for slush molding, a hot melt adhesive, or a powder paint, the powder flowing properties and the properties of sharp break of powder flow during coating tend to be improved.

Moreover, when the values are within the ranges, where the resin particles are employed as a toner, the blade cleaning properties of the toner becomes good.

In the present invention, the shape factor (SF-2) of a resin particle (A) is a value that is obtained by the evaluation that involves randomly sampling 100 resin particle images amplified to a magnification of 500 times by means of an electron microscope (e.g., including FE-SEM (S-800) manufactured by Hitachi Co., Ltd.; also the same hereinafter), introducing the image information into an image analyzer [e.g., including nexus NEW CUBE ver. 2.5 (manufactured by NEXUS) and Luzex III (manufactured by Nicore); also the same hereinafter)] via an interface and analyzing, and then subjecting to the calculation by Equation (1):

$$(SF\text{-}2) = 100 \times (P)^2 / \{4\pi \times (Y)\} \quad (1)$$

where (P) represents the perimeter length of the resin particle and (Y) represents the projection area of the resin particle.

In the present invention, the center line average surface roughness of a resin particle (A) can be determined by means of a scanning probe microscope system (AFM, including, for example, a product from Toyo Technica Inc.). The volume average particle diameter (Dv) and the number average particle diameter (Dn) of the resin particle (A) can be determined using a Coulter counter particle size measuring apparatus [e.g., trade name: Multisizer III (manufactured by Beckman Coulter) or a laser type particle size distribution measuring apparatus [e.g., trade name: LA-920 (manufactured by Horiba, Ltd.)].

The upper limit of the ratio of the volume average particle diameter of the primary particle of a filler (b*) as described later that constitutes at least a portion of a filler (b) and forms the outer shell layer (S) to the volume average particle diameter of a resin particle (A) is normally preferably 0.1, more preferably 0.01, and particularly preferably 0.005.

In addition, the volume average particle diameter of the primary particle of a filler (b*) forming the outer shell layer (S) can be selected that is within the above particle diameter range. For instance, with a resin particle (A) having a volume average particle diameter of 1 μm, the volume average particle diameter of the primary particle is preferably from 0.001 to 0.1 μm, more preferably from 0.001 to 0.005 μm; for a resin particle (A) having a volume average particle diameter of 10 μm, the volume average particle diameter of the primary particle is preferably from 0.001 to 1 μm, more preferably from 0.001 to 0.1 μm, particularly preferably from 0.002 to 0.05 μm; for a resin particle (A) having a volume average particle diameter of 100 μm, the volume average particle diameter of the primary particle is preferably from 0.001 to 10 μm, more preferably from 0.002 to 0.5 μm. The volume average particle diameter of the primary particle of an inorganic filler (b1) is preferably as a whole from 0.001 to 3 μm, more preferably from 0.002 to 0.5 μm. Additionally, with a resin particle for a toner, the volume average particle diameter of the primary particle of a filler (b*) is preferably from 0.001 to 0.5 μm, more preferably from 0.001 to 0.1 μm, particularly preferably from 0.002 to 0.05 μm.

The volume average particle diameter of a filler (b*) is preferably determined by means of a laser type particle size distribution measuring apparatus when the volume average particle diameter is 0.1 μm or more; when the volume average particle diameter is 0.1 μm or less, the volume average particle diameter is preferably calculated from the BET specific surface area and the true specific gravity. The BET specific surface area can usually be determined by an apparatus based on the nitrogen adsorption process [e.g., trade name: QUQN-TASORB (manufactured by QUANTACHROME)]. Dividing the inverse number of the BET specific surface area of a filler (b*) by the true specific gravity of a filler (b*) can lead to the determination of the primary particle diameter of a filler (b*).

The filler (b) content in a resin particle (A) is preferably from 0.01 to 50%, more preferably from 0.05 to 45%, particularly preferably from 0.1 to 40%.

The (b*) content in a resin particle (A) is preferably from 0.01 to 20%, more preferably from 0.05 to 18%, particularly preferably from 0.1 to 15%.

The proportion of (b*) in a filler (b) is preferably 10% or more, more preferably 20% or more.

The filler (b*) preferably has the effect of increasing the viscosity of the outer shell layer (S) in the outer shell layer (S) forming step. The viscosity when the filler (b*) alone is dispersed in a solvent (s) as described later at a temperature of 25° C. in a filler volume fraction of 0.3 is preferably from 50 to 100,000 mPa·s, more preferably from 100 to 50,000 mPa·s, particularly preferably from 150 to 30,000 mPa·s.

The larger the aspect ratio of a filler (b*), the higher the effect of increasing the viscosity of the outer shell layer (S), and the effect is high that forms unevenness on the resin particle (A) surface. Thus, as the aspect ratio of a filler (b*) is increased, unevenness can be formed on the resin particle surface with a low amount of addition of a filler (b*). The aspect ratio is preferably from 1.5 to 1,000, more preferably from 2 to 800, particularly preferably from 2.5 to 600, most preferably from 3 to 500.

The filler (b), at least a portion of which forms the outer shell layer (S), thereby being the filler (b*), is not particularly limited as long as the filler (b) is an inorganic or organic particulate material that does not dissolve in solvents (s) as described later, and may be used alone or in combination with two or more species depending on the purpose. More specifically, an inorganic filler (b1), an organic filler (b2), or a combination of an inorganic filler (b1) and an organic filler (b2) may be acceptable. When used as resin particles for toners, in an organic filler (b2) are contained a colorant, wax, charge controlling agent, and the like that are generally used for resin particles for toners. In addition, the fillers can also be made to be a filler (b*) by filler surface treatment described below.

The inorganic fillers (b1) include, for example, metal oxides such as silica, diatom earth, alumina, zinc oxide, titania, zirconia, calcium oxide, magnesium oxide, iron oxide, copper oxide, tin oxide, chromium oxide, antimony oxide, yttrium oxide, cerium oxide, samarium oxide, lanthanum oxide, tantalum oxide, terbium oxide, europium oxide, neodymium oxide, and ferrites; metal hydroxides such as calcium hydroxide, magnesium hydroxide, aluminum hydroxide, and basic magnesium carbonate; metal carbonate such as heavy calcium carbonate, light calcium carbonate, zinc carbonate, barium carbonate, dawsonite, and hydrolytic; metal sulfates such as calcium sulfate, barium sulfate, and plaster fiber; metal silicates such as calcium silicate (wallasnite, xonotlite), kaolin, clay, talc, mica, montmorillonite, bentonite, activated white earth, sepiolite, imogolite, serisite, glass fiber, glass beads, and glass flakes; metal nitrides such as aluminum nitride, boron nitride, and silicon nitride; metal titanates such as potassium titanate, calcium titanate, magnesium titanate, barium titanate, and lead zirconate titanate aluminum borate; metal borates such as zinc borate, and aluminum borate; metal phosphates such as tricalcium phosphate; metal sulfates such as molybdenum sulfate; metal carbides such as silicon carbide; carbons such as carbon black, graphite, and carbon fiber; and other fillers.

Of these, fillers (b*) that form the outer shell layer (S) preferably include metal oxides, metal carbonates, and metal silicates, more preferably include silica, alumina, zinc oxide, titania, calcium silicate, kaolin, clay, talc, and mica, particularly preferably include silica, alumina and titania.

The organic fillers (b2) include, for example, resin beads such as vinyl resin, urethane resin, epoxy resin, ester resin, polyamides, polyimides, silicone resin, fluorine resin, phenol resin, melamine resin, benzoguanamine-based resin, urea resin, aniline resin, ionomer resin, polycarbonate, cellulose, mixtures thereof. Also, the organic fillers (b2) include organic waxes such as ester-based waxes (carnauba wax, montan wax, rice wax, etc), polyolefin-based waxes (polyethylene, polypropylene, etc), paraffin-based wax, ketone-based wax, ether-based wax, long chain (C30 or more) aliphatic alcohols, long chain (C30 or more) aliphatic acids and mixtures thereof. In addition, the colorants that are generally used such as a variety of organic dyes or organic pigments, e.g., azo, phthalocyanine, condensation polycyclic, and coloring lake dyes or pigments, and derivatives thereof can be used.

Of these, preferable fillers (b*) that form the outer shell layer (S) include a variety of organic dyes or organic pigments such as azo, phthalocyanine, condensation polycyclic, and coloring lake dyes or pigments, and derivatives thereof.

In addition, with resin particles for toners, the fillers (b) that may use include colorants, waxes and charge-controlling agents that are generally used. The charge-controlling agents of the above inorganic or organic fillers include, for example, nigrosin-based dyes, triphenylmethane-based dyes, chromium-containing metal complex dyes, molybdic acid chalate pigments, rhodamine-based dyes, alkoxy-based amines, quarternary ammonium salts (including fluorine-modified quarternary ammonium salts), alkylamides, phosphorus elements or compounds, tungsten elements or compounds, fluorine based surfactants, metal salicylates and metal salts of salicylic acid derivatives. More specifically, the charge-controlling agents include, for example, Bontoron 03 of nigrosin based dyes, Bontron P-51 of quarternary ammonium salts, Bontoron S-34 of metal-bearing azo dyes, E-82 of oxynaphthoic acid based metal complexes, E-84 of salicylic acid based metal complexes, E-89 of phenol based condensation products (the above products manufactured by Orient Chemical Industries, Ltd.), TP-302 and TP-415 of quarternary ammonium salt molybdenum complexes (manufactured by Hodogaya Chemical Co., Ltd.), Copy charge PSY VP2038 of quarternary ammonium salts, Copy blue PR of triphenylmethane derivatives, Copy charge NEG VP2036 and Copy charge NX VP434 of quarternary ammonium salts (manufactured by Hoechst AG), LRA-901, LR-147 of boron complexes (manufactured by Japan Carlit Co., Ltd.), copper phthalocyanine, perylene, quinacridone, azo based dyes, polymer compounds having functional groups such as a sulfo group, a carboxyl group, and a quarternary ammonium salts.

In order that the filler (b*) forms an outer shell layer proximate to the surface of the resin particle (A), the property of the filler (b*) surface preferably has slight hydrophilicity although it is basically hydrophobic. If the filler (b) surface is free of hydrophilic groups and exhibits strong hydrophobicity, the filler (b) is dispersed within the inside of the resin particle (A). Moreover, if the filler (b) surface exhibits sufficiently strong hydrophilicity to the extent that the filler (b)alone disperses in water, the filler (b) will be detached to the aqueous medium (W) side when a dispersion liquid (D) as described later is dispersed in the aqueous medium (W).

Accordingly, for the deformation of the shape of the resin particle (A), the optimization of the hydrophilicity/hydrophobicity balance of the filler (b) surface is required that involves forming the resin particle (A) by means of the method as indicated below for the filler (b) of some different levels of the degree of hydrophilicity/hydrophobicity by the surface treatment of the filler (b) as described later, and confirming the shape of the resin particle (A) and the outer shell layer (S).

The evaluation methods of the hydrophilicity and hydrophobicity of a filler (b) include a process that involves adding, to a water-insoluble solvent dispersion liquid of the filler (b) or a water-insoluble solvent diluted liquid of the dispersion liquid (D) as described later (both diluted by a factor of 10000), water the amount of which is equivalent to the above liquid and forcibly agitating the resulting liquid, and then observing the separation speed of the oil and water phases and the oil water orientation of the filler (b). The water-insoluble solvents that may be used include, for example, toluene, xylene, methyl ethyl ketone, ethyl acetate, and other solvents. If the total amount of the filler (b) migrates to the water phase, making the filler (b) hydrophobic via surface treatment is required because the surface hydrophilicity of the filler (b) is too high. In addition, if the total amount of the filler (b) immediately (within one minute) migrates to the oil phase after forced agitation, hydrophilicity needs to be imparted by surface treatment since the surface hydrophobicity of the filler (b) is too strong. After the forced agitation, it is ideal that the separation between the oil and water mildly occurs, and the filler (b) behaves to orient adjacent to the interface of the oil and water, but the criteria of the evaluation of the observation is only a target.

For the optimization of the surface hydrophilicity/hydrophobicity balance of a filler (b), the filler (b) is preferably surface-treated with a surface treating agent (d) such as a silicone oil, a coupling agent (e.g., a silane coupling agent, a titanate coupling agent, an aluminate coupling agent, or the like), an amine compound, or a commercially available various pigment dispersing agent.

Examples of the silicone oil include straight silicone oils such as dimethyl silicone oil, methyl phenyl silicone oil, and methyl hydrogen silicone oil, and modified silicone oils such as methacrylic acid modified silicone oil, epoxy-modified silicone oil, fluorine-modified silicone oil, polyether-modified silicone oil, and amino-modified silicone oil. In addition, the silane coupling agents include, for example, organoalkoxysilanes, organochlorosilanes, organosilazanes, organodisilazanes, organosiloxanes, organodisiloxanes, and organosilanes, and the like.

The amine compounds that may be used include compounds that are compatible with solvents(s) as described later and have one or more of any of a primary amine group, a secondary amine group, and a tertiary amine group, and in particular compounds having a tertiary amine group being free of active hydrogen are preferably used because there is a possibility that the amine compounds react with a precursor (a0) of the resin (a).

The tertiary amine compounds include, for example, trimethylamine, N,N'-dimethylaminodiethyl ether, tetramethylhexamethylenediamine, tetramethylethylenediamine, dimethylethanolamine, N-methyl-N'-(2-dimethylamino)ethylpiperazine, 1,2-dimethylimidazole, triethylenediamine, N,N,N',N'',N''-pentamethyldiethylenetriamine, N,N,N',N'',N''-pentamethyldipropylenetriamine, tetramethylguanidine, 1,8-diazabicyclo(5,4,0)undecene-7, bis(2-morphorinoethyl) ether, and the like; two or more of these may be used in combination. Of these, particularly preferable species include trimethylamine, 1,8-diazabicyclo(5,4,0)undecene-7, and bis(2-morphorinoethyl) ether.

The process of surface treating a filler (b) is not particularly limited, but well-known methods are applicable; for example, the following the methods [1] to [5] and the combinations thereof, and the like can be applied.

[1] A process involving adding a surface treating agent (d) to a filler [b], and then dry-treating the resulting material by means of a Henschel mixer, a Lodige mixer, or the like.

[2] A process involving melting and kneading a resin (a) and a filler (b) by means of a kneader, as necessary, in the presence of a solvent (s) (integral blend process).

[3] A process involving dispersing and wet-treating, in a solvent (s), a filler (b) and a surface treating agent (d), as required, a resin (a) by means of a beads mill, or the like.

[4] A process involving dispersing a filler (b) in water, adding a surface treating agent (d) to the resulting liquid, wet-treating it, and subsequently replacing the water with a solvent (s).

[5] A process involving directly adding a surface treating agent (d) to a dispersion liquid (D) containing a filler (b), and then dispersing the resulting material with a disperser such as a homomixer, Ebara milder, or the like.

The resin (a) in the present invention may be a thermoplastic resin or a thermosetting resin, and examples of the resin (a) that may be used include a vinyl resin, an urethane resin, an epoxy resin, an ester resin, a polyamide, a polyimide, a silicone resin, a phenol resin, a melamine resin, a urea resin, an aniline resin, an ionomer resin, a polycarbonate, and mixtures thereof. Of these, from the viewpoint of homogeneous fine spherical resin particles being readily obtainable, a vinyl resin, an urethane resin, an epoxy resin, an ester resin, and mixtures thereof are preferable, a vinyl resin, an urethane resin, an ester resin and mixtures thereof are more preferable, a vinyl resin an ester resin and mixtures thereof particularly preferable.

Hereinbelow, these resins to be preferably used as the resin (a), that is, vinyl resins, urethane resins, epoxy resins, and ester resins will be described, but the other resins mentioned above can also be used as the resin (a).

Vinyl resins are homopolymers or copolymers of vinyl monomers.

In polymerization, a well-known polymerization catalyst or the like can be used.

As vinyl monomers, the following compounds (1) to (10) can be used.

(1) Vinyl hydrocarbons:

(1-1) Aliphatic vinyl hydrocarbons:

alkenes having 2 to 12 carbon atoms (e.g., ethylene, propylene, butene, isobutylene, pentene, heptene, diisobutylene, octene, dodecene, octadecene, and α-olefins having 3 to 24 carbon atoms); and alkadienes having 4 to 12 carbon atoms (e.g., butadiene, isoprene, 1,4-pentadiene, 1,6-hexadiene, and 1,7-octadiene).

(1-2) Alicyclic vinyl hydrocarbons:

mono- or di-cycloalkenes having 6 to 15 carbon atoms (e.g., cyclohexene, vinylcyclohexene, and ethylidenebicycloheptene); mono- or di-cycloalkadienes having 5 to 12 carbon atoms (e.g., (di)cyclopentadiene); terpenes (e.g., pinene, limonene, and indene); and the like.

(1-3) Aromatic vinyl hydrocarbons:

styrene; hydrocarbyl(alkyl, cycloalkyl, aralkyl, and/or alkenyl each having 1 to 24 carbon atoms)-substituted styrene (e.g., α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene); vinylnaphthalene; and the like.

(2) Carboxyl group-containing vinyl monomers and salts thereof:

unsaturated monocarboxylic acids having 3 to 30 carbon atoms (e.g., (meth)acrylic acid, crotonic acid, isocrotonic acid and cinnamic acid); unsaturated dicarboxylic acids having 3 to 30 carbon atoms or anhydrides thereof (e.g., maleic acid (anhydride), fumaric acid, itaconic acid, citraconic acid (anhydride), and mesaconic acid); monoalkyl (having 1 to 24 carbon atoms) esters of unsaturated dicarboxylic acids having 3 to 30 carbon atoms (e.g., monomethyl ester of maleic acid, monooctadecyl ester of maleic acid, monoethyl ester of fumaric acid, monobutyl ester of itaconic acid, glycol monoether of itaconic acid, and monoeicosyl ester of citraconic acid);and the like.

Examples of salts of the carboxyl group-containing vinyl monomers include alkali metal salts (e.g., sodium salts and potassium salts), alkaline-earth metal salts (e.g., calcium salts and magnesium salts), ammonium salts, amine salts, and quaternary ammonium salts. The amine salts are not limited to any specific ones as long as they are amine compounds, but primary amine salts (e.g., ethylamine salts, butylamine salts, and octylamine salts), secondary amine salts (e.g., diethylamine salts and dibutylamine salts), and tertiary amine salts (e.g., triethylamine salts and tributylamine salts) can be mentioned, for example. As the quaternary ammonium salts, tetraethylammonium salts, lauryltriethylammonium salts, tetrabutylammonium salts, lauryltributylammonium salts, and the like can be mentioned.

Specific examples of salts of the carboxyl group-containing vinyl monomers include sodium acrylate, sodium methacrylate, monosodium maleate, disodium maleate, potassium acrylate, potassium methacrylate, monopotassium maleate, lithium acrylate, cesium acrylate, ammonium acrylate, calcium acrylate, aluminum acrylate, and the like.

(3) Sulfo group-containing vinyl monomers and salts thereof:

alkenesulfonic acids having 2 to 14 carbon atoms (e.g., vinylsulfonic acid, (meth)allylsulfonic acid, and methylvinylsulfonic acid); styrenesulfonic acid and alkyl (having 2 to 24 carbon atoms) derivatives thereof (e.g., α-methylstyrenesulfonic acid); sulfo (hydroxy) alkyl-(meth)acrylates having 5 to 18 carbon atoms (e.g., sulfopropyl(meth)acrylate, 2-hydroxy-3-(meth)acryloxypropylsulfonic acid, 2-(meth)acryloyloxyethanesulfonic acid, and 3-(meth)acryloyloxy-2-hydroxypropanesulfoic acid); sulfo(hydroxy)alkyl(meth) acrylamides having 5 to 18 carbon atoms (e.g., 2-(meth) acryloylamino-2,2-dimethylethanesulfonic acid, 2-(meth) acrylamide-2-methylpropanesulfonic acid, and 3-(meth) acrylamide-2-hydroxypropanesulfonic acid); alkyl (having 3 to 18 carbon atoms) allylsulfosuccinic acids (e.g., propylallylsulfosuccinic acid, butylallylsulfosuccinic acid, and 2-ethylhexyl-allylsulfosuccinic acid); poly(n=2 to 30)oxyalkylene (oxyethylene, oxypropylene, oxybutylene: homo, random, or block)mono(meth)acrylate sulfates (e.g., poly(n=5 to 15)oxyethylene monomethacrylate sulfate and poly(n=5 to 15)oxypropylene monomethacrylate sulfate); polyoxyethylene polycyclic phenyl ether sulfates (e.g., sulfates represented by the general formula (1-1) or (1-2)); sulfonic acids represented by the general formula (1-3)); salts thereof; and the like.

It is to benoted that counter ions mentioned with reference to "(2) carboxyl group-containing vinyl monomers and salts thereof" or the like are used for the salts.

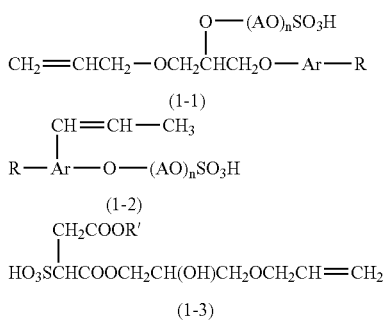

(1-1)

(1-2)

(1-3)

wherein R represents an alkyl group having 1 to 15 carbon atoms, AO represents an oxyalkylene group having 2 to 4 carbon atoms, and wherein when n is plural, oxyalkylene groups may be the same or different, and when different, they may be random, block and/or combination of random and block, Ar represents a benzen ring, n is an integer of 1 to 50, and R' represents an alkyl group having 1 to 15 carbon atoms which may be substituted by a fluorine atom.

(4) Phosphono group-containing vinyl monomers and salts thereof:

(meth)acryloyloxyalkyl (having 1 to 24 carbon atoms) monophosphates (e.g., 2-hydroxyethyl(meth)acryloyl phosphate and phenyl-2-acryloyloxyethyl phosphate), and (meth) acryloyloxyalkyl (having 1 to 24 carbon atoms)phosphonic acids (e.g., 2-acryloyloxyethylphosphonic acid).

(5) Hydroxyl group-containing vinyl monomers:

hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-butene-3-ol, 2-butene-1-ol, 2-butene-1,4-diol, propargyl alcohol, 2-hydroxyethyl propenyl ether, and allyl ether of sucrose, and the like.

(6) Nitrogen-containing vinyl monomers:

(6-1) Amino group-containing vinyl monomers:

aminoethyl(meth)acrylate, dimethylaminoethyl(meth)acrylate, diethylaminoethyl(meth)acrylate, t-butylaminoethyl methacrylate, N-aminoethyl(meth)acrylamide, (meth)allylamine, morpholinoethyl(meth)acrylate, 4-vinylpyridine, 2-vinylpyridine, crotylamine, N,N-dimethylaminostyrene, methyl α-acetaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, aminomercaptothiazole, salts thereof, and the like.

(6-2) Amide group-containing vinyl monomers:

(meth)acrylamide, N-methyl(meth)acrylamide, N-butylacrylamide, diacetoneacrylamide, N-methylol(meth)acrylamide, N,N'-methylene-bis(meth)acrylamide, cinnamamide, N,N-dimethylacrylamide, N,N-dibenzylacrylamide, methacryl formamide, N-methyl-N-vinylacetamide, and N-vinylpyrrolidone, and the like.

(6-3) Nitrile group-containing vinyl monomers having 3 to 10 carbon atoms:

(meth)acrylonitrile, cyanostyrene, cyanoacrylate, and the like.

(6-4) Quaternary ammonium cation group-containing vinyl monomers:

quaternization products (obtained using a quaternizing agent such as methyl chloride, dimethyl sulfate, benzyl chloride, dimethyl carbonate or the like) of tertiary amine group-containing vinyl monomers such as dimethylaminoethyl (meth)acrylate, diethylaminoethyl(meth)acrylate, dimethylaminoethyl(meth)acrylamide, diethylaminoethyl (meth)acrylamide, diallylamine, and the like (e.g., dimethyldiallylammonium chloride and trimethylallylammonium chloride).

(6-5) Nitro group-containing vinyl monomers having 8 to 12 carbon atoms:

nitrostyrene and the like.

(7) Epoxy group-containing vinyl monomers having 6 to 18 carbon atoms:

glycidyl(meth)acrylate, tetrahydrofurfuryl(meth)acrylate, p-vinylphenyl oxide, and the like.

(8) Halogen-containing vinyl monomers having 2 to 16 carbon atoms:

vinyl chloride, vinyl bromide, vinylidene chloride, allyl chloride, chlorostyrene, bromostyrene, dichlorostyrene, chloromethylstyrene, tetrafluorostyrene, chloroprene, and the like.

(9) Vinyl esters, vinyl (thio)ethers, vinyl ketones, and vinyl sulfones:

(9-1) vinyl esters having 4 to 16 carbon atoms:

vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinyl methoxyacetate, vinyl benzoate, ethyl α-ethoxyacrylate, alkyl(meth)acrylates having an alkyl group containing 1 to 50 carbon atoms (e.g., methyl(meth)acrylate, ethyl(meth)acrylate, propyl(meth)acrylate, butyl (meth)acrylate, 2-ethylhexyl(meth)acrylate, dodecyl (meth)acrylate, hexadecyl(meth)acrylate, heptadecyl (meth)acrylate, and eicosyl(meth)acrylate), dialkyl fumarates (whose two alkyl groups are straight, branched or alicyclic groups having 2 to 8 carbon atoms), dialkyl maleates (whose two alkyl groups are straight, branched or alicyclic groups having 2 to 8 carbon atoms), poly(meth)allyloxyalkanes (e.g., diallyloxyethane, triallyloxyethane, tetraallyloxyethane, tetraallyloxypropane, tetraallyloxybutane, and tetramethallyloxyethane), vinyl-based monomers having a polyalkyleneglycol chain [e.g., polyethylene glycol (molecular weight: 300) mono(meth) acrylate, polypropylene glycol (molecular weight: 500) monoacrylate, methyl alcohol-ethylene oxide (hereinafter referred to as EO) (10 mol) adduct (meth)acrylate, and lauryl alcohol-EO (30 mol) adduct (meth)acrylate], and poly(meth) acrylates (e.g., poly(meth)acrylates of polyhydric alcohols: ethylene glycol di(meth)acrylate, propylene glycol di(meth) acrylate, neopentyl glycol di(meth)acrylate, trimethylolpropane tri(meth)acrylate, and polyethylene glycol di(meth) acrylate), and the like.

(9-2) Vinyl (thio)ethers having 3 to 16 carbon atoms:

vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxydiethyl ether, vinyl 2-ethylmercaptoethyl ether, acetoxystyrene, and phenoxystyrene, and the like.

(9-3) Vinyl ketones having 4 to 12 carbon atoms (e.g., vinyl methyl ketone, vinyl ethyl ketone, and vinyl phenyl ketone):

vinyl sulfones having 2 to 16 carbon atoms (e.g., divinyl sulfide, p-vinyl diphenyl sulfide, vinyl ethyl sulfide, vinyl ethyl sulfone, divinyl sulfone, and divinyl sulfoxide), and the like.

(10) Other vinyl monomers:
isocyanatoethyl (meth)acrylate, m-isopropenyl-α, α-dimethylbenzyl isocyanate, and the like.

Among these vinyl monomers, vinyl hydrocarbons, carbxyl group-containing vinyl monomers and salts thereof, sulfonic acid group-containing vinyl monomers and salts thereof, hydroxyl group-containing vinyl monomers, and nitrogen-containing vinyl monomers are preferably used, more preferably, vinyl hydrocarbons, carboxyl group-containing vinyl monomers and salts thereof, and sulfonic acid group-containing vinyl monomers and salts thereof, even more preferably aromatic vinyl-based hydrocarbons, carboxyl group-containing vinyl monomers and salts thereof, and sulfonic acid group-containing vinyl monomers and salts thereof.

Among vinyl resins, as polymers obtained by copolymerizing vinylmonomers (copolymers of vinyl monomers), polymers obtained by copolymerizing two or more of the monomers mentioned in (1) to (10) in any ratio are used. Examples of such copolymers include styrene-(meth)acrylate copolymer, styrene-butadiene copolymer, (meth)acrylic acid-(meth)acrylate copolymer, styrene-acrylonitrile copolymer, styrene-maleic acid (anhydride) copolymer, styrene-(meth)acrylic acid copolymer, styrene-(meth)acrylic acid-divinylbenzene copolymer, and styrene-styrenesulfonic acid-(meth)acrylate copolymer, and the like.

As ester resins, polycondensation products of polyols with polycarboxylic acids, acid anhydrides thereof or lower alkyl esters thereof (alkyl groups having 1 to 4 carbon atoms), and the like can be used.

In polycondensation reaction, a well-known polycondensation catalyst or the like can be used.

As polyols, diols (11) and polyols (12) having 3 to 6 or more hydroxyl groups can be used.

As polycarboxylic acids, acid anhydrides thereof, and lower alkyl esters thereof, dicarboxylic acids (13), polycarboxylic acids (14) having 3 to 6 or more carboxyl groups, acid anhydrides thereof, and lower alkyl esters thereof can be used.

Examples of the diols (11) include alkylene glycols having 4 to 30 carbon atoms (e.g., ethylene glycol, 1,2-propylene glycol, 1,3-propylene glycol, 1,4-butanediol, 1,6-hexanediol, octanediol, decanediol, dodecanediol, tetradecanediol, neopentyl glycol, and 2,2-diethyl-1,3-propanediol), alkylene ether glycols having a molecular weight of 50 to 10,000 (e.g., diethylene glycol, triethylene glycol, dipropylene glycol, polyethylene glycol, polypropylene glycol, and polytetramethylene ether glycol), alicyclic diols having 6 to 24 carbon atoms (e.g., 1,4-cyclohexane dimethanol and hydrogenated-bisphenol A), alkylene oxides (hereinafter, simply referred to as "AO") [e.g., EO, propylene oxide (hereinafter referred to as PO), and butylene oxide (hereinafter referred to as BO)] (2 to 100 mol) adducts of the above-mentioned alicyclic diols having a molecular weight of 100 to 10,000 (e.g., EO (10 mol) adduct of 1,4-cyclohexane dimethanol), AO (EO, PO, BO and the like) (2 to 100 mol) adducts of bisphenols having 15 to 30 carbon atoms (bisphenol A, bisphenol F, bisphenol S, and the like), or polyphenols having 12 to 24 carbon atoms (e.g., catechol, hydroquinone, and resorcin, and the like) (e.g., bisphenol A•EO2-mol adduct, bisphenol A•EO4-mol adduct, bisphenol A•PO 2-mol adduct, bisphenol A•PO 3-mol adduct, bisphenol A•PO 4-mol adduct, and the like); polylactonediols having weight average molecular weights (Mw) of from 100 to 5,000 (e.g., poly-ε-caprolactonediol, and the like); polybutadienediols having Mw of from 1,000 to 20,000; and the like.

Of these, AO adducts of alkylene glycols and bisphenols are preferable, AO adducts of bisphenols and mixtures of AO adducts of bisphenols and alkylene glycols are more preferable.

Polyols (12) having 3 to 6 or more hydroxyl groups include, for example, aliphatic polyhydric alcohols having 3 to 6 or more hydroxyl groups and from 3 to 8 carbon atoms (e.g., glycerin, trimethylolethane, trimethylolpropane, pentaerythritol, sorbitan and sorbitol and the like); alkylene (2 to 4 carbon atoms) oxide (2 to 100 mol) adducts of trisphenols having 25 to 50 carbon atoms (e.g., trisphenol PA, and the like) (e.g., trisphenol PA•EO 2-mol adduct, trisphenol PA•EO 4-mol adduct, trisphenol PA•PO 2-mol adduct, trisphenol PA•PO 3-mol adduct, trisphenol PA•PO 4-mol adduct, and the like); alkylene (2 to 4 carbon atoms) oxide (2 to 100 mol) adducts of novolac resins having polymerization degrees of 3 to 50 (e.g., phenol novolac, cresol novolac, and the like) (e.g., phenol novolac PO 2-mol adduct, phenol novolac EO 4-mol adducts, and the like); alkylene (2 to 4 carbon atoms) oxide (2 to 100 mol) adducts of polyphenols having 6 to 30 carbon atoms (e.g., pyrogallol, fluoroglucinol, 1,2,4-benzenetriol, and the like) (e.g., pyrogallol EO 4-mol adduct, and the like); and acryl polyols having polymerization degrees of 20 to 2,000 [copolymers with hydroxyethyl(meth)acrylate and other vinyl monomers (e.g., styrene, (meth)acrylic acid, (meth)acrylic acid ester, or the like)]; and the like.

Of these, AO adducts of aliphatic polyhydric alchols and novolac resins are preferable, AO adducts of novolac resins are more preferable.

Examples of the dicarboxylic acids (13) include alkanedicarboxylic acids having 4 to 32 carbon atoms (e.g., succinic acid, adipic acid, sebacic acid, dodecenylsuccinic acid, azelaic acid, dodecanedicarboxylic acid, and octadecanedicarboxylic acid), alkenedicarboxylic acids having 4 to 32 carbon atoms (e.g., maleic acid, fumaric acid, citraconic acid, and mesaconic acid), branched-chain alkenedicarboxylic acids having 8 to 40 carbon atoms (e.g., dimer acid and alkenylsuccinic acids such as dodecenylsuccinic acid, pentadecenylsuccinic acid, and octadecenylsuccinic acid), branched-chain alkanedicarboxylic acids having 12 to 40 carbon atoms (e.g., alkylsuccinic acids such as decylsuccinic acid, dodecylsuccinic acid, and octadecylsuccinic acid), and aromatic dicarboxylic acids having 8 to 20 carbon atoms (e.g., phthalic acid, isophthalic acid, terephthalic acid, and naphthalenedicarboxylic acid), and the like.

Among these dicarboxylic acids (13), alkenedicarboxylic acids and aromatic dicarboxylic acids are preferably used, more preferably aromatic dicarboxylic acids.

Examples of the polycarboxylic acids (14) having 3 to 4 or more carboxyl groups include aromatic polycarboxylic acids having 9 to 20 carbon atoms, such as trimellitic acid, and pyromellitic acid, and the like.

Examples of acid anhydrides of the dicarboxylic acids (13) and the polycarboxylic acids (14) having 3 to 4 or more carboxyl groups include trimellitic anhydride and pyromellitic anhydride. Examples of lower alkyl esters thereof include methyl esters, ethyl esters, and isopropyl esters.

As ester resins, the diols, the polyols having 3 to 6 or more hydroxyl groups, the dicarboxylic acids, the polycarboxylic acids having 3 to 4 or more carboxyl groups, and mixtures of two or more of them can be used in any ratio. The equivalent ratio of hydroxyl group [OH] to carboxyl group [COOH], that is, [OH]/[COOH] is preferably in the range of 2/1 to 1/1, more preferably in the range of 1.5/1 to 1/1, even more preferably in the range of 1.3/1 to 1.02/1.

Further, the ester equivalent (that is, a molecular weight per one equivalent of ester group) in the ester resins is preferably in the range of 50 to 2,000, more preferably in the range of 60 to 1,000, even more preferably in the range of 70 to 500.

As urethane resins, polyaddition products of polyisocyanates (15) and active hydrogen-containing compounds (a021) (e.g., water, the diols (11), the polyols (12) having 3 to 6 or more hydroxyl groups, the dicarboxylic acids (13), the polycarboxylic acids (14) having 3 to 4 or more carboxyl groups, polyamines (16), and polythiols (17)), and the like can be used.

In polyaddition reaction, a well-known polyaddition reaction catalyst or the like can be used.

Examples of the polyisocyanates (15) include aromatic polyisocyanates having 6 to 20 carbon atoms (exclusive of the carbon in an NCO group; the same applies to the following description), aliphatic polyisocyanates having 2 to 18 carbon atoms, alicyclic polyisocyanates having 4 to 15 carbon atoms, araliphatic polyisocynates having 8 to 15 carbon atoms, and modification products of these polyisocyanates (e.g., modified polyisocyanates having urethane, carbodiimide, allophanate, urea, biuret, urethodione, urethoimine, isocyanurate, or oxazolidone groups), mixtures of two or more of them, and the like.

Examples of the aromatic polyisocyanates include 1,3- or 1,4-phenylene diisocyanate, 2,4- or 2,6-tolylene diisocyanate (TDI), crude TDI, 2,4'- or 4,4'-diphenylmethane diisocyanate (MDI), crude MDI [phosgenide of crude diaminophenylmethane [a condensation product of formaldehyde with aromatic amine (aniline) or a mixture containing such aromatic amine; a mixture of diaminodiphenylmethane and a small amount (e.g., 5 to 20%) of polyamine having 3 or more amino groups]: polyallyl polyisocyanate (PAPI)], 1,5-naphthylene diisocyante, 4,4',4"-triphenylmethane triisocyanate, m- or p-isocyanatophenylsulfonyl isocyanate, mixtures of two or more of them, and the like.

Examples of the aliphatic polyisocyanates include ethylene diisocyanate, tetramethylene diisocyanate, hexamethylene diisocyanate (HDI), dodecamethylenediisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, 2-isocyanatoethyl-2,6-diisocyanatohexanoate, mixtures of two or more of them, and the like.

Examples of the alicyclic polyisocyanates include isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis (2-isocyanatoethyl)-4-cyclohexene-1,2-dicarboxylate, 2,5- or 2,6-norbornane diisocyanate, mixtures of two or more of them, and the like.

Examples of the araliphatic polyisocyanates include m- or p-xylylene diisocyanate (XDI), α, α, α', α'-tetramethylxylylene diisocyanate (TMXDI), mixtures of two or more of them, and the like.

Examples of the modification products of polyisocyanates include modified polyisocyanates having urethane, carbodiimide, allophanate, urea, biuret, urethodione, urethoimine, isocyanurate and/or oxazolidone groups, such as modified MDI (e.g., urethane-modified MDI, carbodiimide-modified MDI, and trihydrocarbylphosphate-modified MDI), urethane-modified TDI, mixtures of two or more of them [e.g., a mixture of the modified MDI and the urethane-modified TDI (isocyanate-containing prepolymer)], and the like.

Among these polyisocyanates, aromatic polyisocyanates, aliphatic polyisocyanates, and alicyclic polyisocyanates are preferably used, more preferably TDI, MDI, HDI, hydrogenated MDI, and IPDI.

As polyamines (16), aliphatic polyamines having 2 to 18 carbon atoms, aromatic polyamines having 6 to 20 carbon atoms, and the like can be used.

As aliphatic polyamines having 2 to 18 carbon atoms, (1) aliphatic polyamines, (2) alkyl (having 1 to 4 carbon atoms)—or hydroxyalkyl (having 2 to 4 carbon atoms)—substituted aliphatic polyamines mentioned above, (3) alicyclic or heterocycle-containing aliphatic polyamines, (4) aromatic ring-containing aliphatic amines having 8 to 15 carbon atoms, and the like can be used.

(1) Examples of the aliphatic polyamines include alkylenediamines having 2 to 12 carbon atoms (e.g., ethylenediamine, propylenediamine, trimethylenediamine, tetramethylenediamine, and hexamethylenediamine), polyalkylene (having 2 to 6 carbon atoms) polyamines [e.g., diethylenetriamine, iminobispropylamine, bis(hexamethylene)triamine, triethylenetetramine, tetraethylenepentamine, and pentaethylenehexamine], and the like.

(2) Examples of the alkyl (having 1 to 4 carbon atoms)—or hydroxyalkyl (having 2 to 4 carbon atoms)—substituted aliphatic polyamines mentioned above include dialkyl (having 1 to 3 carbon atoms) aminopropylamine, trimethylhexamethylenediamine, aminoethylethanolamine, 2,5-dimethyl-2,5-hexamethylenediamine, and methyliminobispropylamine, and the like.

(3) Examples of the alicyclic or heterocycle-containing aliphatic polyamines include alicyclic polyamines having 4 to 15 carbon atoms {e.g., 1,3-diaminocyclohexane, isophoronediamine, menthenediamine, 4,4'-methylenedicyclohexanediamine (hydrogenated methylenedianiline), and 3,9-bis (3-aminopropyl)-2,4,8,10-tetraoxaspiro[5,5]undecane}, and heterocyclic polyamines having 4 to 15 carbon atoms [e.g., piperazine, N-aminoethylpiperazine, 1,4-diaminoethylpiperazine, and 1,4-bis(2-amino-2-methylpropyl)piperazine], and the like.

(4) Examples of the aromatic ring-containing aliphatic amines (having 8 to 15 carbon atoms) include xylylenediamine, tetrachloro-p-xylylenediamine, and the like.

As the above-mentioned aromatic polyamines having 6 to 20 carbon atoms, (1) unsubstituted aromatic polyamines, (2) aromatic polyamines nuclearly substituted by one or more alkyl groups (having 1 to 4 carbon atoms, such as methyl, ethyl, n- or i-propyl and butyl), (3) aromatic polyamines having one or more electron-attracting groups such as halogen (e.g., Cl, Br, I, and F), alkoxy groups (e.g., methoxy and ethoxy), and a nitro group, and (4) secondary amino group-containing aromatic polyamines, and the like can be used.

(1) Examples of the unsubstituted aromatic polyamines include 1,2-, 1,3- or 1,4-phenylenediamine, 2,4'- or 4,4'-diphenylmethanediamine, crude diphenylmethanediamine (polyphenylpolymethylenepolyamine), diaminodiphenyl sulfone, benzidine, thiodianiline, bis(3,4-diaminophenyl)sulfone, 2,6-diaminopyridine, m-aminobenzylamine, triphenylmethane-4,4',4"-triamine, naphthylenediamine, mixtures of two or more of them, and the like.

(2) Examples of the aromatic polyamines nuclearly substituted by one or more alkyl groups having 1 to 4 carbon atoms, such as methyl, ethyl, n- or i-propyl and butyl include 2,4- or 2,6-tolylenediamine, crude tolylenediamine, diethyltolylenediamine, 4,4'-diamino-3,3'-dimethyldiphenylmethane, 4,4'-bis(o-toluidine), dianisidine, diaminoditolyl sulfone, 1,3-dimethyl-2,4-diaminobenzene, 1,3-diethyl-2,4-diaminobenzene, 1,3-dimetnyl-2,6-diaminobenzene, 1,4- diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenyl ether, 3,3',5,5'-tetraisopropyl-4,4'-diaminodiphenyl sulfone, mixtures of two or more of them, and the like.

(3) Examples of the aromatic polyamines having one or more electron-attracting groups such as halogen (e.g., a chlorine atom, a bromine atom, an iodine atom, and a fluorine atom), alkoxy groups (e.g., methoxy and ethoxy), and a nitro group as nuclear substituents include methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, 4,4'-diamino-3,3'-dimethyl-5,5'-dibromo-diphenylmethane, 3,3'-dichlorobenzidine, 3,3'-dimethoxybenzidine, bis(4-amino-3-chlorophenyl)oxide, bis(4-amino-2-chlorophenyl)propane, bis(4-amino-2-chlorophenyl)sulfone, bis(4-amino-3-methoxyphenyl)decane, bis(4-aminophenyl)sulfide, bis(4-aminophenyl)telluride, bis(4-aminophenyl)selenide, bis(4-amino-3-methoxyphenyl)disulfide, 4,4'-methylenebis(2-iodoaniline), 4,4'-methylenebis(2-bromoaniline), 4,4'-methylenebis(2-fluoroaniline), 4-aminophenyl-2-chloroaniline, and the like.

(4) Examples of the secondary amino group-containing aromatic polyamines include aromatic polyamines obtained by replacing some or all of —NH$_2$ groups in the aromatic polyamines (1) to (3) with —NH—R' groups (wherein R' represents an alkyl group such as a lower alkyl group having 1 to 4 carbon atoms e.g., methyl, ethyl, or the like), such as 4,4'-di(methylamino)diphenylmethane, and 1-methyl-2-methylamino-4-aminobenzene, and the like; polyamide polyamines such as low molecular-weight polyamide polyamines obtained by condensation of dicarboxylic acids (e.g., dimer acid) with excess (that is, 2 or more mols per mol of the acid) polyamines (e.g., the alkylenediamines and the polyalkylenepolyamines mentioned above); polyether polyamines such as hydrides of cyanoethylation products of polyether polyols (e.g., polyalkylene glycol); and the like.

As polythiols (17), dithiols having 2 to 24 carbon atoms, tri- to hexa- or higher valent polythiols having 5 to 30 carbon atoms, and the like can be used.

Examples of dithiols include ethylenedithiol, 1,4-butanedithiol, 1,6-hexanedithiol, and the like.

Examples of polythiols include Capcure-3800 (manufactured by Japan Epoxy Resins Co., Ltd.), polyvinylthiol, and the like.

Among these active hydrogen-containing compounds (a021), water, the diols (11), the polyols (12), the dicarboxylic acids (13), and the polyamines (16) are preferably used, more preferably water, the diols (11), the polyols (12), and the polyamines (16), even more preferably the diols (11), the polyols (12), and the polyamines (16).

As epoxy resins, ring-opening polymerization products of polyepoxides (18), polyaddition products of the polyepoxides (18) and the active hydrogen-containing compounds (a021), and curing reaction products of the polyepoxides (18) and acid anhydrides of the dicarboxylic acids (13) or the polycarboxylic acids (14) having 3 to 4 or more carboxyl groups, and the like can be used.

In ring-opening polymerization reaction, polyaddition reaction, and curing reaction, a well-known catalyst or the like can be used.

The polyepoxide (18) is not limited to any specific one as long as it has two or more epoxy groups in the molecule, but from the viewpoint of mechanical characteristics of the cured product, it preferably has 2 to 6 epoxy groups in the molecule.

The epoxy equivalent (that is, molecular weight per epoxy group) of the polyepoxide (18) is preferably in the range of 65 to 1,000. The upper limit is more preferably 500, even more preferably 300. The lower limit is more preferably 70, even more preferably 90. If the epoxy equivalent exceeds the above upper limit, the cross-linked structure tends to be loose, thus resulting in lowering of physical properties of the cured product, such as water resistance, chemical resistance, mechanical strength, and the like. On the other hand, it is difficult to get (or synthesize) polyepoxides having an epoxy equivalent less than the above lower limit.

As polyepoxides (18), aromatic polyepoxides, heterocycle-containing polyepoxides, alicyclic polyepoxides, aliphatic polyepoxides, and the like can be used.

As aromatic polyepoxides, glycidyl ethers of polyhydric phenols, glycidyl esters of polyhydric phenols, glycidyl aromatic polyamines, and glycidylation products of aminophenols, and the like can be used.

Examples of the glycidyl ethers of polyhydric phenols include bisphenol F diglycidyl ether, bisphenol A diglycidyl ether, bisphenol B diglycidyl ether, bisphenol AD diglycidyl ether, bisphenol S diglycidyl ether, bisphenol A diglycidyl halides, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthalene diglycidyl ether, dihydroxybiphenyl diglycidyl ether, octachloro-4,4'-dihydroxybiphenyl diglycidyl ether, tetramethylbiphenyl diglycidyl ether, dihydroxynaphthylcresol triglycidyl ether, tris(hydroxyphenyl)methane triglycidyl ether, dinaphthyltriol triglycidyl ether, tetrakis(4-hydroxyphenyl)ethane tetraglycidyl ether, p-glycidylphenyldimethyltolyl bisphenol A glycidyl ether, trismethyl-tert-butyl-butylhydroxymethane triglycidyl ether, 9,9'-bis(4-hydroxyphenyl)fluorene diglycidyl ether, 4,4'-oxybis(1,4-phenylethyl)tetracresol glycidyl ether, 4,4'-oxybis(1,4-phenylethyl)phenyl glycidyl ether, bis(dihydroxynaphthalene)tetraglycidyl ether, glycidyl ether of phenol or cresol novolac resin, glycidyl ether of limonene phenol novolac resin, diglycidyl ether obtained by the reaction between 2 mols of bisphenol A and 3 mols of epichlorohydrin, polyglycidyl ethers of polyphenols obtained by condensation reaction of phenol with glyoxal, glutaraldehyde, or formaldehyde, polyglycidyl ether of polyphenol obtained by condensation reaction of resorcin with acetone, and the like.

Examples of the glycidyl esters of polyhydric phenols include diglycidyl phthalate, diglycidyl isophthalate, diglycidyl terephthalate, and the like.

Examples of the glycidyl aromatic polyamines include N,N-diglycidylaniline, N,N,N',N'-tetraglycidylxylylenediamine, and N,N,N',N'-tetraglycidyldiphenylmethanediamine, and the like.

Further, the epoxides include triglycidyl ether of p-aminophenol, diglycidyl urethane compounds obtained by the addition reaction of tolylene diisocyanate or diphenylmethane diisocyanate and glycidol, and diglycidyl ethers of AO (EO or PO) (2 to 20 mol) adducts of bisphenol A (e.g., diglycidyl ether of EO (4 mol) adduct of bisphenol A).

As heterocyclic polyepoxides, trisglycidylmelamine can be used.

As alicyclic polyepoxides, vinylcyclohexene dioxide, limonene dioxide, dicyclopentadiene dioxide, bis(2,3-epoxycyclopentyl) ether, ethylene glycol bisepoxydicyclopentyl ether, 3,4-epoxy-6-methylcyclohexylmethyl-3',4'-epoxy-6'-methylcyclohexanecarboxylate, bis(3,4-epoxy-6-methylcyclohexylmethyl) adipate, bis(3,4-epoxy-6-methylcyclohexylmethyl)butylamine, dimer acid diglycidyl ester, and nuclear hydrogenation products of aromatic polyepoxides (e.g., hydrogenated bisphenol F diglycidyl ether and hydrogenated bisphenol A diglycidyl ether) can be used, for example.

As aliphatic polyepoxides, polyglycidyl ethers of polyhydric aliphatic alcohols, polyglycidyl esters of polyvalent fatty acids, glycidyl aliphatic amines, and the like can be used.

Examples of the polyglycidyl ethers of polyhydric aliphatic alcohols include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, polyglycerol polyglycidyl ether, and the like.

Examples of the polyglycidyl esters of polyvalent fatty acids include diglycidyl oxalate, diglycidyl maleate, diglycidyl succinate, diglycidyl glutarate, diglycidyl adipate, diglycidyl pimelate, and the like.

Examples of the glycidyl aliphatic amines include N,N,N',N'-tetraglycidyl hexamethylenediamine, and N,N,N',N'-tetraglycidyl ethylenediamine, and the like.

The aliphatic polyepoxides include (co)polymers of diglycidyl ethers and glycidyl(meth)acrylates.

Among these polyepoxides, aliphatic polyepoxy compounds and aromatic polyepoxy compounds are preferably used. In the present invention, the polyepoxides may be used in combination of two or more of them.

A resin (a) is a resin that constitutes a resin particle (A), and the number average molecular weight (Mn), the peak molecular weight, the glass transition point (Tg), the melting point, the SP value, the hydroxyl value, and the acid value of the resin (a) are preferably in the following ranges.

For instance, when the resin particle (A) is used as a slush molding resin or a powder paint, the Mn of the resin (a) is preferably from 2,000 to 500,000, more preferably from 2,500 to 200,000, particularly preferably 4,000 to 100,000.

In addition, when a resin (a) has a melting point, the melting point of a resin (a) is preferably from 0 to 250° C., more preferably from 35 to 200° C., particularly preferably from 40 to 180° C.

When a resin (a) is used as a toner resin particle, the number average molecular weight (Mn) of a resin (a) is preferably from 1,000 to 20,000, more preferably from 1,500 to 17,500, particularly preferably from 1,750 to 15,000, most preferably from 2,000 to 12,500, from the viewpoints of thermal storage stability, low-temperature fixing properties and anti-hot offset properties. Additionally, the peak molecular weight is preferably from 1,000 to 30,000, more preferably from 1,500 to 10,000, particularly preferably from 2,000 to 8,000. If the peak molecular weight is 1,000 or more, the thermal storage stability is enhanced; when it is 10,000 or less, the low-temperature fixing properties are better.

Moreover, the Mn and Mw of a resin (a) described above and below are determined by gel permeation chromatography (GPC; THF solvent, reference substance; polystyrene) Furthermore, the melting point is determined via DSC (rate of temperature increase; 20° C./min).

In addition, the Tg of a resin (a) is preferably from −60 to 100° C., more preferably from −40 to 80° C., particularly preferably from −30 to 70° C. In particular, when a resin (a) is used as a toner resin particle, the Tg of a resin (a) is preferably from 30 to 80° C., more preferably from 35 to 75° C., particularly preferably from 40 to 70° C., from the viewpoints of thermal storage stability and low-temperature fixing properties.

Additionally, the Tg described above and below is evaluated from DSC (differential scanning calorimetry, the rate of temperature increase 20° C./min).

Moreover, the SP value of a resin (a) is preferably from 7 to 18, more preferably from 8 to 16, particularly preferably from 9 to 14.

Furthermore, the SP value described above and below is calculated from the methods as described in "Polymer Engineering and Science, February, 1974, Vol. 14, No. 2, pp. 147 to 154.

When a resin (a) is used as a toner resin particle, the hydroxyl value of the resin (a) is preferably 5 or more, more preferably from 10 to 120, particularly preferably from 20 to 80. The hydroxyl value of 5 or more provides advantages in compatibility between thermal storage stability and low-temperature fixing properties. In addition, the acid value of the resin (a) is preferably from 1 to 30, more preferably from 5 to 20. Giving an acid value to the resin (a) tends to allow the resin (a) to be of negative electricity. Moreover, the resin (a) having an acid value and a hydroxyl value, respectively, equal to upper limit values of these ranges or less, is hardly affected by circumstances of high temperature, high humidity, low temperature and low humidity, thereby not suffering the deterioration of images.

The resin particle (A) may also contain therein, in addition to the resin (a) and the filler (b), additives (t) (e.g., a variety of additives such as a plasticizer, a filler, a mold release agent, a charge controlling agent, an ultraviolet absorbing agent, an antioxidant, an antistatic agent, a flame retardant, an antimicrobial agent, and an antiseptic agent).

The total content of additives (t) can be appropriately added depending on various applications, but for example is preferably from 0.01 to 200%, more preferably from 0.2 to 150%, particularly preferably from 0.1 to 100%, based on the mass of the total of the resin (a) and filler (b).

Examples of a plasticizer (k) to be added include, but not limited to, the following (k1) to (k5) and mixtures of two or more of them:

(k1) phthalic acid esters having 8 to 60 carbon atoms (e.g., dibutyl phthalate, dioctyl phthalate, butyl benzyl phthalate, and diisodecyl phthalate);

(k2) aliphatic dibasic acid esters having 6 to 60 carbon atoms (e.g., di-2-ethylhexyl adipate and 2-ethylhexyl sebacate);

(k3) trimellitic acid esters having 10 to 70 carbon atoms (e.g., tri-2-ethylhexyl trimellitate and trioctyl trimellitate);

(k4) phosphoric acid esters having 6 to 60 carbon atoms (e.g., triethyl phosphate, tri-2-ethylhexyl phosphate, and tricresyl phosphate); and (k5) fatty acid esters having 8 to 50 carbon atoms (e.g., butyl oleate).

Among these plasticizers, (k1), (k2), (k3), and (k4) are preferably used, more preferably (k1), (k2), and (k4), even more preferably (k1) and (k4).

A method for adding the additive (t) to the resin particles (A) is not limited to any specific one. For example, in the preparing method of resin particles according to the present invention (which will be described later), the additive (t) may be added to an aqueous medium, or a mixture of the resin (a) and the additive (t) may be dispersed in an aqueous medium.

The processes of producing a resin particle (A) can include, for example, a method that involves dispersing in an aqueous medium (W) a filler-containing dispersion liquid (D) obtained by dispersing a filler (b) in a dispersion liquid (D0) comprising a resin (a) and/or its precursor (a0) in solvent (s), forming a resin (a) by reaction when the precursor (a0) is used, forming an oil-in-water dispersion liquid (D1), and removing the aqueous solvent from an aqueous dispersion containing a resin particle (A) obtained by solvent removal.

The process of producing an aqueous dispersion containing a resin particle (A) is not particularly limited, and illustrative examples thereof include a method that involves dispersing in an aqueous medium (W) a dispersion liquid (D) comprising a precursor (a0) of a resin (a), a filler (b) and a solvent (s) described later, and reacting the precursor in the aqueous medium, a method that involves producing a dead polymer of a resin (a), adding thereto a filler (b) and a solvent (s) described later, and dispersing the resulting material in an aqueous medium (W), a method that involves reacting a precursor (a0) of a resin (a) in an aqueous medium(w) dispersed a dead polymer of the resin (a), a filler (b) and a solvent (s) described later, and the like.

The methods that involve dispersing in an aqueous medium (W) a dispersion liquid (D) comprising a precursor (a0) of a resin (a), a filler (b) and a solvent (s) described later, and reacting the precursor in the aqueous medium, include, for example, the following the methods [1] and [2].

[1] A method of producing an aqueous dispersion of a resin particle (A) by subjecting monomers as starting materials to polymerization reaction such as suspension polymerization, emulsification polymerization, seed polymerization or dispersion polymerization, in the presence of a polymerization catalyst, a filler (b) and a solvent (s) as described later in the case of a vinyl resin.

[2] A method of producing an aqueous dispersion of a resin particle (A) that involves dispersing a precursor (a0) of a resin (a) or a solvent solution of the precursor (a0) and a filler (b) in an aqueous medium in the presence of an appropriate dispersing agent in the case of polyaddition resins or condensed resins such as an ester resin, an urethane resin and an epoxy resin, then heating the resulting material or adding a curing agent (a compound having at least two functional groups capable of reacting with the precursor within the molecule) for curing.

The methods that involve producing a dead polymer of a resin (a) and then dispersing the polymer in an aqueous medium include the methods [3] and [4] below.

[3] A method that involves dispersing a dispersion liquid comprising a resin (a) prepared by polymerization reaction in advance (the polymerization reaction processes may include any of addition polymerization, ring-opening polymerization, polyaddition, addition condensation, and condensation polymerization), a filler (b) and a solvent (s) described later in an aqueous medium in the presence of an appropriate dispersing agent, and then subjecting the resulting liquid to heating, pressure reduction or the like to remove the solvent.

[4] A method that involves dissolving an appropriate emulsifier in a dispersion liquid comprising a resin (a) prepared by polymerization reaction in advance (the polymerization reaction processes may include any of addition polymerization, ring-opening polymerization, polyaddition, addition condensation, and condensation polymerization), a filler (b) and a solvent (s) described later, phase-inversion emulsifying the resulting liquid by water addition, and then subjecting the resulting emulsion to heating, pressure reduction or the like to remove the solvent.

Of the methods [1] to [4] above, the methods [1], [2], [3] and combinations thereof are preferable, and the methods [2], [3] and combinations thereof are more preferable.

The method in which a precursor of the resin (a) is allowed to react in an aqueous medium will be described in more detail.

The precursor (a0) of the resin (a) is not limited to any specific one as long as it can be converted to the resin (a) by chemical reaction. For example, in a case where the resin (a) is a vinyl resin, examples of the precursor (a0) include the vinyl monomers mentioned above (which may be used singly or in combination of two or more of them) and solutions thereof.

In a case where the vinyl monomer is used as the precursor (a0), examples of the method for allowing the precursor (a0) to react to convert it to the resin (a) include a method in which an oil phase comprised of an oil-soluble initiator, the monomer, filler (b) and a solvent (s) (which will be described later) is dispersed and suspended in water under the presence of a synthetic polymeric dispersant (h) to carry out radical polymerization reaction by heating (that is, the so-called suspension polymerization method), and a method in which an oil phase comprised of the monomer and a solvent (s) is emulsified in water containing an emulsifier and a water-soluble initiator to carry out radical polymerization reaction by heating (that is, the so-called emulsion polymerization method).

As the oil-soluble initiator and the water-soluble initiator, peroxide polymerization initiators, and azo polymerization initiators, and the like can be used. A peroxide polymerization initiator may be used in combination with a reducing agent to form a redox polymerization initiator. Further, these initiators can be used in combination of two or more of them.

Examples of the peroxide polymerization initiators include oil-soluble peroxide polymerization initiators and water-soluble peroxide polymerization initiators.

As oil-soluble peroxide polymerization initiators, acetylcyclohexylsulfonyl peroxide, isobutylyl peroxide, diisopropyl peroxydicarbonate, di-2-ethylhexyl peroxydicarbonate, 2,4-dichlorobenzoyl peroxide, t-butyl peroxypivalate, 3,5,5-trimethylhexanonyl peroxide, octanoyl peroxide, decanoyl peroxide, lauroyl peroxide, stearoly peroxide, propionitrile peroxide, succinic acid peroxide, acetyl peroxide, t-butyl peroxy-2-ethylhexanoate, benzoyl peroxide, p-chlorobenzoylperoxide, t-butylperoxyisobutylate, t-butyl peroxymaleic acid, t-butyl peroxylaurate, cyclohexanone peroxide, t-butyl peroxyisopropylcarbonate, 2,5-dimethyl-2,5-dibenzoylperoxyhexane, t-butyl peroxyacetate, t-butyl peroxybenzoate, diisobutyl diperoxyphthalate, methyl ethyl ketone peroxide, dicumyl peroxide, 2,5-dimethyl-2,5-di-t-butylperoxyhexane, t-butylcumyl peroxide, t-butyl hydroperoxide, di-t-butyl peroxide, diisopropylbenzene hydroperoxide, p-menthane hydroperoxide, pinane hydroperoxide, 2,5-dimethylhexane-2,5-dihydroperoxide, cumene peroxide, and the like can be used.

As water-soluble peroxide polymerization initiators, hydrogen peroxide, peracetic acid, ammonium persulfate, potassium persulfate, sodium persulfate, and the like can be used.

Examples of the azo polymerization initiators include oil-soluble azo polymerization initiators and water-soluble azo polymerization initiators.

As oil-soluble azo polymerization initiators, 2,2'-azobisisobutyronitrile, 1,1'-azobiscyclohexane-1-carbonytrile, 2,2'-azobis-4-methoxy-2,4-dimethylvaleronitrile, 2,2'-azobis-2,4-dimethylvaleronitrile, dimethyl-2,2'-azobis(2-methylpropionate), 1,1'-azobis(1-acetoxy-1-phenylethane), 2,2'-azobis(4-methoxy-2,4-dimethylvaleronitrile), and the like can be used.

As water-soluble azo polymerization initiators, azobisamidinopropane salt, azobiscyanovaleric acid (salt), 2,2'-azobis [2-methyl-N-(2-hydroxyethyl)propionamide], and the like can be used.

As redox polymerization initiators, oil-soluble redox polymerization initiators and water-soluble redox polymerization initiators can be mentioned.

Examples of the oil-soluble redox polymerization initiators include combinations of oil-soluble peroxides such as hydroperoxides (e.g., tert-butyl hydroxyperoxide and cumene hydroxyperoxide), dialkyl peroxides (e.g., lauroyl peroxide), diacyl peroxides (e.g., benzoyl peroxide), and the like and oil-soluble reducing agents such as tertiary amines (e.g., triethylamine and tributylamine), naphthenic acid salts, mercaptans (e.g., mercaptoethanol and lauryl mercaptan), organic metal compounds (e.g., triethylaluminum, triethylboron, and diethylzinc), and the like.

Examples of the water-soluble redox polymerization initiatiors include combinations of water-soluble peroxides such as persulfate salts (e.g., potassium persulfate and ammonium persulfate), hydrogen peroxide, hydroperoxides (e.g., tert-butyl hydroxyperoxide and cumene hydroxyperoxide), and the like and water-soluble inorganic or organic reducing agents such as iron (II) salts, sodium bisulfite, alcohols, and dimethylaniline).

In a case where the resin (a) is a condensed resin (e.g., urethane resin, an epoxy resin, or ester resin), a combination of a reactive group-containing prepolymer (a01) and a curing agent (a02) (which will be described later) may also be used as the precursor (a0). Here, the word "reactive group" means a group capable of reacting with the curing agent (a02).

In this case, examples of a method of allowing the precursor (a0) to react to form the resin particles (A) include the following methods (1) to (3):

(1) a method in which an oil phase containing the reactive group-containing prepolymer (a01), the curing agent (a02), the filler (b) and the solvent (s) is dispersed in an aqueous medium, and then the reactive group-containing prepolymer (a01) and the curing agent (a02) are allowed to react by heating to form the resin particles (A) comprising the resin (a);

(2) a method in which the reactive group-containing prepolymer (a01), the filler (b) and the solvent (s) are dispersed in an aqueous medium, and a water-soluble curing agent (a02) is added thereto to allow them to react so as to form the resin particles (A) comprising the resin (a); and (3) a method in which a dispersion containing the reactive group-containing prepolymer (a01), the filler (b) and the solvent (s) are dispersed in an aqueous medium to allow the reactive group-containing prepolymer (a01) to react with water to form the resin particles (A) comprising the resin (a), the method being applicable to a case where the reactive group-containing prepolymer (a01) can be cured by the reaction with water.

Examples of a combination of the reactive group contained in the reactive group-containing prepolymer (a01) and the curing agent (a02) include the following combinations (1) and (2):

(1) a combination of a reactive group-containing prepolymer (a011) having a functional group capable of reacting with an active hydrogen-containing group and an active hydrogen-containing compound (a021); and (2) a combination of a reactive group-containing prepolymer (a012) having an active hydrogen-containing group, and a curing agent (a022) having a functional group capable of reacting with an active hydrogen-containing group.

Among these combinations, the combination (1) is preferably used from the viewpoint of reaction rate in water.

Examples of a functional group capable of reacting with an active hydrogen-containing group include an isocyanate group, a blocked isosyanate group, an epoxy group, an acid anhydride group, and an acid halide (e.g., acid chlorides and acid bromides) group.

Among them, an isocyanate group, a blocked isocyanate group, and an epoxy group are preferably used, more preferably an isocyanate group and a blocked isocyanate group.

In this regard, it is to be noted that the blocked isocyanate group means an isocyanate group that is blocked with a blocking agent.

Examples of the blocking agent include well-known blocking agents such as oximes (e.g., acetoxime, methyl isobutyl ketoxime, diethyl ketoxime, cyclopentanone oxime, cyclohexanone oxime and methyl ethyl ketoxime), lactams (e.g., γ-butyrolactam, ε-caprolactam, and γ-valerolactam), aliphatic alcohols having 1 to 20 carbon atoms (e.g., ethanol, methanol, and octanol), phenols (e.g., phenol, m-cresol, xylenol, and nonylphenol), activemethylene compounds (e.g., acetylacetone, ethyl malonate, and ethyl acetoacetate), basic nitrogen-containing compounds (e.g., N,N-diethylhydroxylamine, 2-hydroxypiridine, pyridine N-oxide, and 2-mercaptopyridine), and mixtures of two or more of them.

Among these blocking agents, oximes are preferably used, more preferably methyl ethyl ketoxime.

As the skeleton of the reactive group-containing prepolymer (a01), polyethers, ester resins, epoxy resins, or urethane resins can be used.

Among them, ester resins, epoxy resins, and urethane resins are preferably used, more preferably ester resins and urethane resins.

Examples of polyethers include polyethylene oxide, polypropylene oxide, polybutylene oxide, and polytetramethylene oxide.

Examples of ester resins include polycondensation products of the diols (11) and the dicarboxylic acids (13), and polylactones (e.g., the ring-opening polymerization product of ε-caprolactone).

Examples of epoxy resins include addition-condensation products of bisphenols (e.g., bisphenol A, bisphenol F, and bisphenol S) and epichlorohydrine.

Examples of urethane resins include polyaddition products of the diols (11) and the polyisocyanates (15), and polyaddition products of the ester resins and the polyisocyanates (15).

A method of introducing the above mentioned reactive group into the ester resin, the epoxy resin, or the urethane resin is not limited to any specific one, but examples of such a method include the following methods (1) and (2):

(1) a method in which one of components constituting the ester resin, the epoxy resin, or the urethane resin is used excessively to allow a reactive group of the component to remain; and (2) a method in which one of components constituting the ester resin, the epoxy resin, or the urethane resin is used excessively to allow a functional group of the component to remain, and then the functional group is further reacted with a compound having a functional group (reactive group) capable of reacting with the remaining functional group.

According to the method (1), it is possible to obtain a hydroxyl group-containing ester resin prepolymer, a carboxyl group-containing ester resin prepolymer, an acid halide group-containing ester resin prepolymer, a hydroxyl group-containing epoxy resin prepolymer, an epoxy group-containing epoxy resin prepolymer, a hydroxyl group-containing urethane resin prepolymer, and an isocyanate group-containing urethane resin prepolymer, and the like.

For example, in the case of a hydroxyl group-containing ester resin prepolymer, the ratio between the components in the method (1), that is, the ratio between the alcohol components (e.g., the diols (11) and the polyols (12)) and the carboxylic acid components (e.g., the dicarboxylic acids (13) and the polycarboxylic acids (14)) as expressed in terms of the equivalent ratio of hydroxyl group [OH] to carboxyl group [COOH], that is, the equivalent ratio [OH]/[COOH] is preferably in the range of 2/1 to 1/1, more preferably in the range of 1.5/1 to 1/1, even more preferably in the range of 1.3/1 to 1.02/1.

In each of the cases of a carboxyl group-containing ester resin prepolymer, an acid halide group-containing ester resin prepolymer, a hydroxyl group-containing urethane resin prepolymer, and an isocyanate group-containing urethane resin prepolymer, components thereof are different from those of the example case, but a preferred ratio between the components is the same as described above.

According to the method (2), an isocyanate group-containing prepolymer can be obtained by allowing a prepolymer obtained by the method (1) to react with polyisocyanate, a blocked isocyanate group-containing prepolymer can be obtained by allowing a prepolymer obtained by the method (1) to react with blocked polyisocyanate, an epoxy group-containing prepolymer can be obtained by allowing a prepolymer obtained by the method (1) to react with polyepoxide, and an acid anhydride group-containing prepolymer can be obtained by allowing a prepolymer obtained by the method (1) to react with a compound having 2 or more acid anhydride groups.

For example, in the case of obtaining an isocyanate group-containing ester resin prepolymer by allowing a hydroxyl group-containing ester resin to react with polyisocyanate according to the method (2), the amount of the compound having a reactive group to be used, that is, the ratio between the hydroxyl group-containing ester resin and polyisocyanate to be used as expressed in terms of the equivalent ratio of isocyanate group [NCO]/hydroxyl group [OH], that is, the equivalent ratio [NCO]/[OH] is preferably in the range of 5/1 to 1/1, more preferably in the range of 4/1 to 1.2/1, even more preferably in the range of 2.5/1 to 1.5/1.

In each of the cases of other prepolymers, components thereof are different from those of the example case, but a preferred ratio between the components is the same as described above.

The average number of the reactive group per molecule contained in the reactive group-containing prepolymer (a01) is preferably in the range of 1 to 3, more preferably in the range of 1.5 to 3, even more preferably in the range of 1.8 to 2.5. By setting the average number of the reactive group per molecule contained in the reactive group-containing prepolymer (a01) to a value within the above range, it is possible for the resin (a) obtained by the reaction with the curing agent (a02) to have high mechanical strength.

The Mn of the reactive group-containing prepolymer (a01) is preferably in the range of 500 to 30,000. The upper limit is more preferably 20,000, even more 10,000, the lower limit is more preferably 1,000, even more 2,000.

The Mw of the reactive group-containing prepolymer (a01) is preferably in the range of 1,000 to 50,000. The upper limit is more preferably 40,000, even more preferably 20,000, the lower limit is more preferably 2,000, even more preferably 4,000.

As the active hydrogen group-containing compounds (a021), polyamines which may be blocked with removable compounds and polyols which may be blocked with removable compounds can be mentioned, in addition to the above mentioned water, the diols (11), the polyols (12) having 3 to 6 or more hydroxyl groups, the dicarboxylic acids (13), the polycarboxylic acids (14) having 3 to 4 or more carboxyl groups, the polyamines (16), and the polythiols (17).

Examples of a polyamine blocked with a removable compound include ketimine compounds obtained by dehydration between the polyamines (16) and ketones having 3 to 8 carbon atoms (e.g., acetone, methyl ethyl ketone, and methyl isobutyl ketone), aldimine compounds obtained by dehydration between the polyamines (16) and aldehyde compounds having 2 to 8 carbon atom (e.g., formaldehyde and acetaldehyde), enamine compounds obtainable from the polyamines (16) and ketones having 3 to 8 carbon atoms or aldehydes having 2 to 8 carbon atoms, and oxazolidine compounds.

Among these active hydrogen group-containing compounds (a021), polyamines which may be blocked, polyols which may be blocked, and water are preferably used, more preferably polyamines which may be blocked and water, even more preferably polyamines, ketimine compounds and water, most preferably 4,4'-diaminodiphenylmethane, xylylenediamine, isophoronediamine, ethylenediamine, diethylenetriamine, triethylenetetramine, ketimine compounds obtainable from these polyamines and ketones, and water.

When the resin particles (A) are produced, a reaction terminator (a02s) may be used as necessary together with the active hydrogen group-containing compound (a021). By using the reaction terminator (a02s) and the active hydrogen group-containing compound (a021) together in a certain ratio, it becomes easy to control the molecular weight of the resin (a) comprising the resin particles (A).

Examples of such a reaction terminator (a02s) include monoamines having 1 to 40 carbon atoms (e.g., diethylamine, dibutylamine, butylamine, laurylamine, monoethanolamine, and diethanolamine); blocked monoamines having 3 to 40 carbon atoms (e.g., ketimine compounds); monools having 1 to 40 carbon atoms (e.g., methanol, ethanol, isopropanol, butanol, and phenol); monomercaptans having 2 to 40 carbon atoms (e.g., butylmercaptan and laurylmercaptan); monoisocyanates having 5 to 40 carbon atoms (e.g., butyl isocyanate, lauryl isocyanate, and phenyl isocyanate); and monoepoxides having 2 to 40 carbon atoms (e.g., butyl glycidyl ether).

In the combination (2) described above (that is, in the combination of the reactive group-containing prepolymer (a012) having an active hydrogen-containing group and the curing agent (a022) having a functional group capable of reacting with an active hydrogen-containing group), examples of the active hydrogen-containing group contained in the reactive group-containing prepolymer (a01) include an amino group, hydroxyl groups (an alcoholic hydroxyl group and a phenolic hydroxyl group), a mercapto group, a carboxyl group, and organic groups obtained by blocking these groups with removable compounds (e.g., ketones and aldehydes) (e.g., a ketimine-containing group, an aldimine-containing group, an oxazolidine-containing group, an enamine-containing group, an acetal-containing group, a ketal-containing group, a thioacetal-containing group, and a thioketal-containing group).

Among these active hydrogen-containing groups, an amino group, hydroxyl groups, and organic groups obtained by blocking these groups with removable compounds are preferably used, more preferably hydroxyl groups.

Examples of the curing agent (a022) having a functional group capable of reacting with an active hydrogen-containing group include the polyisocyanates (15), the polyepoxides (18), the dicarboxylic acids (13), the polycarboxylic acids (14), compounds having two or more acid anhydride groups, and compounds having two or more acid halide groups.

Among these curing agents (a022), the polyisocyanates and the polyepoxides are preferably used, more preferably the polyisocyanates.

Examples of the compound having two or more acid anhydride groups include a (co)polymer of pyromellitic anhydride and polymaleic anhydride, and the like.

Examples of the compound having two or more acid halide groups include acid halides (e.g., acid chloride, acid bromide, and acid iodide) of the dicarboxylic acids (13) or the polycarboxylic acids (14).

When the resin particles (A) are produced, the reaction terminator (a02s) may be used as necessary together with the curing agent (a022) having a functional group capable of reacting with an active hydrogen-containing group. By using the reaction terminator (a02s) and the curing agent (a022) together in a certain ratio, it becomes easy to control the molecular weight of the resin (a) constituting the resin particles (A).

The amount of the curing agent (a02) to be used as expressed in terms of the ratio [a01]/[a02] of the equivalent of the reactive group [a01] in the reactive group-containing prepolymer (a01) to the equivalent of the active hydrogen-containing group [a02] in the curing agent (a02) is preferably in the range of 1/2 to 2/1, more preferably in the range of 1.5/1 to 1/1.5, even more preferably in the range of 1.2/1 to 1/1.2.

In a case where water is used as the curing agent (a02), water is considered as a bifunctional active hydrogen-containing compound.

The length of time of reaction between the reactive group-containing prepolymer (a01) and the curing agent (a02) is selected according to reactivity that depends on the combination of the kind of reactive group contained in the prepolymer (a01) and the curing agent (a02), but is preferably in the range of 10 minutes to 40 hours, more preferably in the range of 30 minutes to 24 hours, even more preferably in the range of 30 minutes to 8 hours.

Further, the temperature of the reaction is preferably in the range of 0 to 150° C., more preferably in the range of 50 to 120° C.

As necessary, a well-known catalyst can be used. Specifically, in the case of the reaction between isocyanate and an active hydrogen-containing compound by way of example, dibutyltin laurate, dioctyltin laurate or the like can be used.

As the emulsifier and the dispersant used in the above-mentioned methods (1) to (4) for obtaining the aqueous dispersion containing the resin particles (A), well-known surfactants (f) and synthetic polymeric dispersants (h), and the like can be mentioned.

In a case where the surfactant (f) is used, the amount thereof to be used is preferably in the range of 0.0001 to 50%, more preferably in the range of 0.0005 to 0.4%, even more preferably in the range of 0.001 to 0.3% with respect to the mass of the resin (a), the precursor thereof (a0) and the filler (b).

In a case where the synthetic polymeric dispersant (h) is used, the amount thereof to be used is preferably in the range of 0.005 to 0.6%, more preferably in the range of 0.01 to 0.4%, even more preferably in the range of 0.02 to 0.3% with respect to the mass of the resin (a), the precursor thereof (a0) and the filler (b).

Further, the plasticizer (k) or the like may be used as an emulsifier assistant or a dispersant assistant.

In a case where the plasticizer (k) is used, the amount thereof to be used is preferably in the range of 0.01 to 0.3%, more preferably in the range of 0.02 to 0.25%, even more preferably in the range of 0.03 to 0.2% with respect to the mass of the resin (a) and the precursor thereof (a0).

The plasticizer (k) may be added as necessary to either water or the resin (a) at dispersion-emulsification.

As surfactants (f), anionic surfactants (f-1), cationic surfactants (f-2), amphoteric surfactants (f-3), and nonionic surfactants (f-4), and the like can be used. In this regard, it is to be noted that these surfactants (f) can be used in combination of two or more of them. In addition to those exemplified blow, such surfactants as described in WO03/037964 can be used.

Examples of the anionic surfactant (f-1) include carboxylic acids or salts thereof, sulfuric acid ester salts, salts of carboxymethylation products, sulfonic acid salts, and phosphoric acid ester salts.

As carboxylic acids or salts thereof, saturated or unsaturated fatty acids having 8 to 22 carbon atoms or salts thereof can be used, and examples of such carboxylic acids include capric acid, lauric acid, myristic acid, palmitic acid, stearic acid, oleic acid, linoleic acid, ricinoleic acid, and mixtures of higher fatty acids obtained by saponifying coconut oil, palm kernel oil, rice bran oil, beef tallow, and the like.

As the salts of these carboxylic acids, sodium salts, potassium salts, amine salts, ammonium salts, quaternary ammonium salts, and alkanolamine salts (e.g., monoethanolamine salt, diethanolamine salt, and triethanolamine salt), and the like can be mentioned.

As sulfuric acid ester salts, higher alcohol sulfuric acid ester salts ($C_8$-$C_{18}$ aliphatic alcohol sulfuric acid ester salts), higher alkyl ether sulfuric acid ester salts ($C_8$-$C_{18}$ aliphatic alcohol-E or PO (1 to 10 mol) adduct sulfuric acid ester salts), sulfated oils (which are obtained by directly sulfating and neutralizing naturally-occurring unsaturated fats and oils having 12 to 50 carbon atoms or unsaturated waxes), sulfated fatty acid esters (which are obtained by sulfating and neutralizing lower alcohol (having 1 to 8 carbon atoms) esters of unsaturated fatty acids (having 6 to 40 carbon atoms)), and sulfated olefins (which are obtained by sulfating and neutralizing olefins having 12 to 18 carbon atoms), and the like can be used.

As the salts, sodium salts, potassium salts, amine salts, ammonium salts, quaternary ammonium salts, alkanolamine salts (e.g., monoethanolamine salt, diethanolamine salt, and triethanolamine salt), and the like can be mentioned.

Examples of the higher alcohol sulfuric acid ester salts include salts of octyl alcohol sulfate, salts of lauryl alcohol sulfate, salts of stearyl alcohol sulfate, sulfuric acid ester salts of alcohols (e.g., "ALFOL 1214" which is a product of CONDEA) synthesized using a Ziegler catalyst, and sulfuric acid ester salts of alcohols (e.g., "Dobanol 23, 25, 45" and "Diadol 115-L, 115-H, 135" which are products of Mitsubishi Chemical Corporation, "Tridecanol" which is a product of Kyowa Hakko Kogyo Co., Ltd., and "Oxocol 1213, 1215, 1415" which are products of Nissan Chemical Industries, Ltd.) synthesized by oxo process.

Examples of the higher alkyl ether sulfuric acid ester salts include lauryl alcohol-EO (2 mol) adduct sulfuric acid ester salts, and octyl alcohol-EO (3 mol) adduct sulfuric acid ester salts.

Examples of the sulfated oil include salts of sulfation products of castor oil, arachis oil, olive oil, rape oil, beef tallow, mutton tallow, and the like.

Examples of the sulfated fatty acid ester include salts of sulfation products of butyl oleate, butyl ricinoleate, and the like.

An example of the sulfated olefins includes Teepol (which is a product of Shell Co.).

As salts of carboxymethylation products, salts of carboxymethylation products of aliphatic alcohols having 8 to 16 carbon atoms, salts of carboxymethylation products of $C_8$-$C_{16}$ aliphatic alcohol-EO or PO (1 to 10 mol) adducts, and the like can be used.

Examples of the salts of carboxymethylation products of aliphatic alcohols include a sodium salt of carboxymethylated octyl alcohol, a sodium salt of carboxymethylated decyl alcohol, a sodium salt of carboxymethylated lauryl alcohol, and a sodium salt of carboxymethylated tridecanol.

Examples of the salts of carboxymethylation products of aliphatic alcohol-EO (1 to 10 mol) adducts include a sodium salt of carboxymethylation product of octyl alcohol-EO (3mol) adduct, a sodium salt of carboxymethylation product of lauryl alcohol-EO (4 mol) adduct, and a sodium salt of carboxymethylation product of Dobanol 23-EO (3 mol) adduct.

As sulfonic acid salts, alkylbenzene sulfonates, alkylnaphthalene sulfonates, sulfosuccinic acid diester salts, α-olefin sulfonates, IgeponT type, other sulfonates of aromatic ring-containing compounds, and the like can be used.

An example of the alkylbenzene sulfonates includes sodium dodecylbenzensulfonate.

An example of the alkylnaphthalene sulfonates includes sodium dodecylnaphthalenesulfonate.

An example of the sulfosuccinic acid diester salts includes sodium di-2-ethylhexyl sulfosuccinate.

Examples of the sulfonates of aromatic ring-containing compounds include alkylated diphenyl ether mono- or disulfonate and styrenated phenol sulfonate.

As phosphoric acid ester salts, higher alcohol phosphoric acid ester salts, higher alcohol-EO adduct phosphoric acid ester salts, and the like can be used.

Examples of the higher alcohol phosphoric acid ester salts include lauryl alcohol phosphoric acid monoester disodium salt, and lauryl alcohol phosphoric acid diester sodium salt.

An example of the higher alcohol-EO adduct phosphoric acid ester salts includes oleyl alcohol-EO (5 mol) adduct phosphoric acid monoester disodium salt.

As cationic surfactants (f-2), quaternary ammonium salt-type surfactants, amine salt-type surfactants, and the like can be used.

The quaternary ammonium salt-type surfactants can be obtained by the reaction between tertiary amines having 3 to 40 carbon atoms and quaternizing agents (e.g., alkylating agents such as methyl chloride, methyl bromide, ethyl chloride, benzyl chloride, and dimethyl sulfate, and EO), and examples of such quaternary ammonium salt-type surfactants include lauryltrimethylammonium chloride, dioctyldimethylammonium bromide, stearyltrimethylammonium bromide, lauryldimethylbenzylammonium chloride (benzalkonium chloride), cetylpyridinium chloride, polyoxyethylenetrimethylammonium chloride, and stearamidoethyldiethylmethylammonium methosulfate.

The amine salt-type surfactants can be obtained by neutralizing primary to tertiary amines with inorganic acid (e.g., hydrochloric acid, nitric acid, sulfuric acid, hydrogen iodide, phosphoric acid, or perchloric acid) or organic acid (e.g., acetic acid, formic acid, oxalic acid, lactic acid, gluconic acid, adipic acid, alkylphosphoric acid having 2 to 24 carbon atoms, malic acid, or citric acid).

Examples of primary amine salt-type surfactants include inorganic or organic acid salts of aliphatic higher amines having 8 to 40 carbon atoms (e.g., higher amines such as laurylamine, stearylamine, hydrogenated beef tallow amine, and rosin amine), and $C_8$-$C_{40}$ higher fatty acid (e.g., stearic acid and oleic acid) salts of lower amines having 2 to 6 carbon atoms.

Examples of secondary amine salt-type surfactants include inorganic or organic acid salts of aliphatic amine (having 4 to 40 carbon atoms)-EO adducts.

Examples of tertiary amine salt-type surfactants include inorganic or organic acid salts of aliphatic amines having 4 to 40 carbon atoms (e.g., triethylamine, ethyldimethylamine, and N,N,N',N'-tetramethylethylenediamine), aliphatic amines (having 2 to 40 carbon atoms)-EO (2 or more mol) adducts, alicyclic amines having 6 to 40 carbon atoms (e.g., N-methylpyrrolidine, N-methylpiperidine, N-methylhexamethyleneimine, N-methylmorpholine, and 1,8-diazabicyclo (5,4,0)-7-undecene), nitrogen-containing heterocyclic aromatic amines having 5 to 30 carbon atoms (e.g., 4-dimethylaminopyridine, N-methylimidazole, and 4,4'-dipyridyl), and inorganic or organic acid salts of tertiary amines such as triethanolamine monostearate, stearamidoethyldiethylmethylethanolamine, and the like.

As amphoteric surfactants (f-3), carboxylic acid salt-type amphoteric surfactants, sulfuric acid ester salt-type amphoteric surfactants, sulfonic acid salt-type amphoteric surfactants, phosphoric acid ester salt-type amphoteric surfactants, and the like can be used.

As the carboxylic acid salt-type amphoteric surfactants, amino acid-based amphoteric surfactants, betaine-type amphoteric surfactants, and imidazoline-type amphoteric surfactants, and the like can be used. The amino acid-type amphoteric surfactant is an amphoteric surfactant having an amino group and a carboxyl group in the molecule, and examples of such amino acid-type amphoteric surfactant include compounds represented by the general formula (2):

$$[R\text{—}NH\text{—}(CH_2)_n\text{—}COO]_mM \qquad (2)$$

wherein R represents a monovalent hydrocarbon group, n is 1 or 2, m is 1 or 2, and M represents a hydrogen ion, an alkali metal ion, an alkaline-earth metal ion, an ammonium cation, an amine cation, an alkanolamine cation, or the like.

Examples of the amphoteric surfactants represented by the general formula (2) include alkyl (having 6 to 40 carbon atoms) aminopropionic acid-type amphoteric surfactants (e.g., sodium stearylaminopropionate and sodium laurylaminopropionate) and alkyl (having 4 to 24 carbon atoms) aminoacetic acid-type amphoteric surfactants (e.g., sodium laurylaminoacetate).

The betaine-type amphoteric surfactant is an amphoteric surfactant having a quaternary ammonium salt-type cationic moiety and a carboxylic acid-type anionic moiety in the molecule, and examples of such a betaine-type amphoteric surfactant include alkyl (having 6 to 40 carbon atoms) dimethylbetaines (e.g., stearyldimethylaminoacetic acid betaine and lauryldimethylaminoacetic acid betaine), amido betaines having 6 to 40 carbon atoms (e.g., coco-fatty acid amidopropyl betaine), and alkyl (having 6 to 40 carbon atoms) dihydroxyalkyl (having 6 to 40 carbon atoms) betaines (e.g., lauryldihydroxyethyl betaine).

The imidazoline-type amphoteric surfactant is an amphoteric surfactant having a cationic moiety containing an imidazoline ring and a carboxylic acid-type anionic moiety, and an example of such an imidazoline-type amphoteric surfactant includes 2-undecyl-N-carboxymethyl-N-hydroxyethylimidazolinium betaine.

As other amphoteric surfactants, glycine-type amphoteric surfactants such as sodium lauroyl glycine, sodium lauryl diaminoethylglycine, lauryldiaminoethylglycine hydrochloride, and dioctyldiaminoethylglycine hydrochloride, sulfobetaine-based amphoteric surfactants such as pentadecylsulfotaurine, sulfonic acid salt-type amphoteric surfactants, and phosphoric acid ester salt-type amphoteric surfactants, and the like can be used.

As nonionic surfactants (f-4), AO adduct-type nonionic surfactants and polyhydric alcohol-type nonionic surfactants, and the like can be used.

The AO adduct-type nonionic surfactants can be obtained by directly adding AO (having 2 to 20 carbon atoms) to higher alcohols having 8 to 40 carbon atoms, higher fatty acids having 8 to 40 carbon atoms or alkylamines having 8 to 40 carbon atoms, or by reacting higher fatty acids with polyalkylene glycols obtained by adding AO to glycol, or by adding AO to esterification products obtained by the reaction of polyhydric alcohols and higher fatty acids, or by adding AO to higher fatty acid amides.

Examples of AO include EO, PO, and BO.

Among them, EO, and a random or block adduct of EO and PO are preferably used.

The number of mols of the AO to be added is preferably in the range of 10 to 50 mols, and 50 to 100% of the added AO is preferably EO.

Examples of the AO adduct-type nonionic surfactants include oxyalkylene($C_2$-$C_{24}$) alkyl($C_8$-$C_{40}$) ethers (e.g., octyl alcohol-EO (20 mol) adduct, stearyl alcohol-EO (10 mol) adduct, oleyl alcohol-EO (5 mol) adduct, and lauryl alcohol-EO (10 mol)/PO (20 mol) block adduct); polyoxyalkylene ($C_2$-$C_{24}$) higher fatty acid($C_8$-$C_{40}$) esters (e.g., stearic acid-EO (10 mol) adduct and lauric acid-EO (10 mol) adduct); higher fatty acid($C_8$-$C_{40}$) esters of polyoxyalkylene($C_2$-$C_{24}$) polyhydric alcohols($C_3$-$C_{40}$), (e.g., polyethylene glycol (Degree of polymerization of 20) lauric acid diester, and polyethylene glycol (Degree of polymerization of 20) oleic acid diester; polyoxyalkylene($C_2$-$C_{24}$) alykyl($C_8$-$C_{40}$)phenyl ethers (e.g., nonylphenol-EO (4 mol) adduct, bisphenol A-EO (10 mol) adduct, and styrenated phenol-EO (20 mol) adduct); polyoxyalkylene($C_2$-$C_{24}$) alkyl($C_8$-$C_{40}$)amino ethers (e.g., laurylamine-EO (10 mol) adduct and stearylamine-EO (10 mol) adduct); and polyoxyalkylene($C_2$-$C_{24}$) alkanolamides (in which amide (acylmoiety) has 8 to 24 carbon atoms) (e.g., hydroxypropyl oleylamide-EO (20 mol) adduct, and dihydroxyethyl laurylamide-EO (10 mol) adduct).

As polyhydric alcohol-type nonionic surfactants, polyhydric alcohol fatty acid esters, polyhydric alcohol fatty acid ester-AO adducts, polyhydric alcohol alkyl ethers, polyhydric alcohol alkyl ether-AO adducts, and the like can be used. Here, polyhydricalcohols have 3 to 24 carbon atoms, fatty acids have 8 to 40 carbon atoms, and AO has 2 to 24 carbon atoms.

Examples of the polyhydric alcohol fatty acid esters include pentaerythritol monolaurate, pentaerythritol monooleate, sorbitan monolaurate, sorbitan monostearate, sorbitan dioleate, and sucrose monostearate.

Examples of the polyhydric alcohol fatty acid ester-AO adducts include ethylene glycol monooleate-EO (10 mol) adduct, ethylene glycol monostearate-EO (20 mol) adduct, trimethylolpropane monostearate-EO (20 mol)/PO (10 mol) random adduct, sorbitan monolaurate-EO (10 mol) adduct, sorbitan distearate-EO (20 mol) adduct, and sorbitan dilaurate-EO (12 mol)/PO (24 mol) random adduct.

Examples of the polyhydric alcohol alkyl ethers include pentaerythritol monobutyl ether, pentaerythritol monolauryl ether, sorbitan monostearyl ether, methyl glycoside, and lauryl glycoside.

Examples of the polyhydric alcohol alkyl ether-AO adducts include sorbitan monostearyl ether-EO (10 mol) adduct, methyl glycoside-EO (20 mol)/PO (10 mol) random adduct, and stearyl glycoside-EO (20 mol)/PO (20 mol) random adduct.

Examples of the synthetic polymeric dispersants (h) include polyvinyl alcohol, polyvinyl pyrrolidone, polyethylene glycol, polyethylene imine, and water-soluble urethane resins (e.g., reaction products of polyethylene glycol or polycaprolactone diol with polyisocyanates).

In the above methods of [1] to [4] for obtaining an aqueous dispersion containing resin particles (A), by using the method [3] or the combination of the methods [2] and [3], a method of using organic fine particles (A2) as at least a portion of a dead polymer of a resin (a), i.e., a method that involves adding the fine resin particles (A2), as a dispersion stabilizer, to an aqueous medium (W), and carrying out, as necessary, a reaction of a precursor (a0) in the an aqueous medium (W), can provide the resin particles (A) having a sharp particle size distribution. In other words, the above methods involve dispersing a resin (a) or its solvent solution or a precursor (a0) of the resin (a) or its solvent solution in an aqueous dispersion of a fine resin particles (A2) comprising a resin (a2), carrying out, as necessary, the reaction of the precursor (a0), and then adsorbing the fine resin particles (A2) onto the surfaces of resin particles (A1) having particle diameters larger than those of the fine resin particles (A2) when the resin particles (A) are formed, thereby preventing the resin particles (A1) or oil drops (A0) from sticking together in the oil-in-water dispersion liquid (D1), and also rarely fragmenting the resin particles (A) in high shearing conditions. This converges the particle diameters of the resin particles (A) on a specified value, resulting the higher uniformity in particle diameter.

Therefore, the preferable properties of the fine resin particles (A2) include having an extent of strength of not being broken by shearing in a temperature during dispersion, hardly dissolving in water or swelling by water, or hardly dissolving in or swelling by a resin (a) or its solvent solution or a precursor (a0) of a resin (a) or its solvent solution.

The resins (a2) constituting fine resin particles (A2) include, for example, a vinyl resin, an urethane resin, an epoxy resin, an ester resin, a polyamide, a polyimide, a silicone resin, a fluorine resin, a phenol resin, a melamine resin, benzoguanamine based resin, an urea resin, an aniline resin, an ionomer resin, a polycarbonate, cellulose, mixtures thereof, and the like.

The method of preparing an aqueous dispersion of fine resin particles (A2) from a resin (a2) is not particularly limited, and the following the methods [1] to [8] are included.

[1] A method of directly producing an aqueous dispersion of fine resin particles (A2) via polymerization reaction such as suspension polymerization, emulsification polymerization, seed polymerization or dispersion polymerization, using monomers as starting materials for a vinyl resin.

[2] A method of producing an aqueous dispersion of fine resin particles (A2) that involves dispersing a precursor (monomer, oligomer, or the like) or its solvent solution in an aqueous medium in the presence of an appropriate dispersing agent, and heating the resulting liquid or adding a curing agent thereto for curing, in the case of polyaddition resins or condensed resins such as an ester resin, a urethane resin, and an epoxy resin.

[3] A method that involves dissolving an appropriate emulsifier in a precursor (monomer, oligomer, or the like) or its solvent solution (preferably a liquid, or may be liquefied by heating), phase-inversion emulsifying the resulting solution by water addition, then heating it or adding a curing agent thereto for curing, in the case of polyaddition resins or condensed resins such as an ester resin, a urethane resin, and an epoxy resin.

[4] A method that involves grinding a resin prepared by polymerization reaction (the polymerization reaction methods that are allowable include any of addition polymerization, ring-opening polymerization, polyaddition, addition condensation, condensation polymerization, and the like) in advance by means of a granular grinder such as a machine rotating type grinder or a jet type grinder, obtaining resin particles by classification, and then dispersing the resulting particles in water in the presence of an appropriate dispersing agent.

[5] A method that involves spraying in the form of a mist a resin solution prepared by dissolving, in a solvent, a resin prepared by polymerization reaction (the polymerization reaction methods that are allowable include any of addition polymerization, ring-opening polymerization, polyaddition, addition condensation, condensation polymerization, and the like) in advance to obtain resin particles, and subsequently dispersing the resin particles in water in the presence of an appropriate dispersing agent.

[6] A method that involves adding a poor solvent to a resin solution prepared by dissolving, in a solvent, a resin prepared by polymerization reaction (the polymerization reaction methods that are allowable include any of addition polymerization, ring-opening polymerization, polyaddition, addition condensation, condensation polymerization, and the like) in advance, or cooling the resin solution that is heat-dissolved in a solvent in advance to precipitate the resin particles, obtaining the resin particles by removal of the solvent, and then dispersing the resin particles in water in the presence of an appropriate dispersing agent.

[7] A method that involves dispersing, in an aqueous medium, a resin solution prepared by dissolving, in a solvent, a resin prepared by polymerization reaction (the polymerization reaction methods that are allowable include any of addition polymerization, ring-opening polymerization, polyaddition, addition condensation, condensation polymerization, and the like) in advance in the presence of an appropriate dispersing agent, and then subjecting the resulting liquid to heating, pressure reduction or the like to remove the solvent.

[8] A method that involves dissolving an appropriate emulsifier in a resin solution prepared by dissolving, in a solvent, a resin prepared by polymerization reaction (the polymerization reaction methods that are allowable include any of addition polymerization, ring-opening polymerization, polyaddition, addition condensation, condensation polymerization, and the like) in advance, and then adding water thereto to phase-inversion emulsify the material.

The dispersing agent and emulsifier used in the methods [1] to [8] can utilize the above surfactant (f) used in the method of producing a resin particle (A).

The particle diameter of a fine resin particle (A2) is normally smaller than that of a resin particle (A1); the value of the particle diameter ratio [volume average particle diameter of fine resin particles (A2)]/[volume average particle diameter of resin particles (A1)] is preferably in the range of from 0.001 to 0.3 from the standpoint of particle diameter uniformity. If this particle diameter ratio is larger than 0.3, the particle size distribution of the resulting resin particles (A) tends to widen because fine resin particles (A2) do not efficiently adsorb on the surface of resin particles (A1).

The volume average particle diameter of fine resin particles (A2) can be appropriately controlled in the range of the above particle diameter ratio so as to be a particle diameter suitable for obtaining a resin particle (A) having a desirable particle diameter. For instance, if resin particles (A) having a volume average particle diameter of 1 μm are needed, the volume average particle diameter of the fine resin particles (A2) is preferably in the range of from 0.0005 to 0.3 μm, particularly preferably in the range of from 0.001 to 0.2 m; if resin particles (A) having a volume average particle diameter of 10 μm are needed, the volume average particle diameter of the fine resin particles (A2) is preferably in the range of from 0.005 to 3 μm, particularly preferably in the range of from 0.05 to 2 μm; if resin particles (A) having a volume average particle diameter of 100 μm are needed, the volume average particle diameter of the fine resin particles (A2) is preferably in the range of from 0.05 to 30 μm, particularly preferably in the range of from 0.1 to 20 μm.

From the standpoints of particle diameter uniformity, powder flowability and storage stability, of resin particles (A), preferably 5% or more of the surface of a resin particle (A1) is covered with fine resin particles (A2), more preferably 30% or more of the surface of a resin particle (A1) is covered with fine resin particles (A2). The surface coverage can be determined from the image analysis of images obtained by a scanning electron microscope (SEM) according to the equation below:

Surface coverage (%)=[area of a portion covered with a fine resin particle ($A2$)/(area of a portion covered with a fine resin particle ($A2$)+area of a portion in which a resin particle ($A1$) is exposed)]×100

Examples of the solvents (s) used in the methods [1] to [4] to obtain the aqueous dispersion containing resin particles (A) include aromatic hydrocarbon solvents (e.g., toluene, xylene, ethylbenzene, and tetralin); aliphatic or alicyclic hydrocarbon solvents (e.g., n-hexane, n-heptane, mineral spirit, and cyclohexane); halogen-containing solvents (e.g., methyl chloride, methyl bromide, methyl iodide, methylene dichloride, carbon tetrachloride, trichloroethylene, and perchloroethylene); ester or ester ether solvents (e.g., ethyl acetate, butyl acetate, methoxybutyl acetate, methylcellosolve acetate, and ethylcellosolve acetate); ether solvents (e.g., diethyl ether, tetrahydrofuran, dioxane, ethylcellosolve, butylcellosolve, and propylene glycol monomethyl ether); ketone solvents (e.g., acetone, methyl ethyl ketone, methyl isobutyl ketone, di-n-butyl ketone, and cyclohexanone); alcohol solvents (e.g., methanol, ethanol, n-propanol, isopropanol, n-butanol, isobutanol, t-butanol, 2-ethylhexyl alcohol, and benzyl alcohol); amide solvents (e.g., dimethylformamide and dimethylacetamide); sulfoxide solvents (e.g., dimethylsulfoxide); heterocyclic compound solvents (e.g., N-methylpyrrolidone); and mixtures of two or more of them.

The solubility of the solvent (s) in water is preferably 80% or less, more preferably 70% or less, particularly preferably 50% or less. The presence of the solubility of the solvent (s) in the above ranges causes the solvent (s) to be not instantaneously extracted into the water phase in the formation of the resin particle (A), so that an accumulation layer (S0) in which the concentration of at least a portion (b*) of the filler (b) is high is easy to form in an oil droplet (A0) in the oil-in-water dispersion (D1).

In addition, the boiling point of the solvent (s) is preferably 120° C. or less, more preferably 100° C. or less, particularly preferably from 40 to 80° C., from the viewpoint of easy removal during solvent removal.

The plasticizer (k) to be used is not limited to any specific one, and the above-mentioned plasticizers (k1) to (k5) and mixtures of two or more of them can be used. A preferred range of the amount of the plasticizer to be used is the same as described above.

The amount of an aqueous medium to be used with respect to 100 parts by mass (hereinafter, "parts" means "parts by mass") of the resin (a) is preferably in the range of 50 to 2,000 parts, more preferably in the range of 100 to 1,000 parts, even more preferably in the range of 100 to 500 parts. If the amount of an aqueous medium to be used is less than above lower limit, dispersibility of the resin (a) tends to be lowered. On the other hand, if the amount of an aqueous medium to be used exceeds the above upper limit, economic problems tend to arise.

It should be noted that the aqueous medium is not limited to any specific one as long as it is a liquid containing water as an essential component. Examples of such an aqueous medium include water, aqueous solutions of solvents, aqueous solutions of the surfactants (f), aqueous solutions of the synthetic polymeric dispersants (h), and mixtures of two or more of them.

Examples of the solvents include, among the solvents (s) mentioned above, ester or ester ether solvents, ether solvents, ketone solvents, alcohol solvents, amide solvents, sulfoxide solvents, heterocyclic compound solvents, and mixtures of two or more of them.

In a case where the aqueous medium contains such a solvent, the amount of the solvent contained in the aqueous medium is preferably in the range of 1 to 80% with respect to the mass of the aqueous medium. The upper limit is more preferably 70%, even more preferably 30%, the lower limit is more preferably 2%, even more preferably 5%.

In a case where the surfactant (f) is used, the amount of the surfactant (f) contained in the aqueous medium is preferably in the range of 0.001 to 0.3%, more preferably in the range of 0.005 to 0.2%, even more preferably in the range of 0.01 to 0.15% with respect to the mass of the aqueous medium.

In a case where the synthetic polymeric dispersant (h) is used, the amount of the synthetic polymeric dispersant (h) contained in the aqueous medium is preferably in the range of 0.0001 to 0.2%, more preferably in the range of 0.0002 to 0.15%, even more preferably in the range of 0.0005 to 0.1% with respect to the mass of the aqueous medium.

When the resin (a) and/or the precursor (a0) is dispersed in the aqueous medium, the resin (a) and the precursor (a0) are preferably in the form of liquid or solution. In a case where the rein (a) and the precursor (a0) are solid at room temperatures, the resin (a) and the precursor (a0) may be dispersed at a temperature of the melting point thereof or higher so that they can be dispersed in liquid form, or a solution obtained by dissolving the resin (a) and the precursor (a0) in the above-mentioned solvent (s) may be used.

In a case where the solvent (s) is used, a preferred solvent depends on the kind of resin (a) and precursor (a0) to be used, but the difference in SP value between the resin (a) and the precursor (a0) is preferably 3 or less.

The viscosities of the resin (a), the precursor (a0) and solvent solutions of these are preferably from 10 to 50,000 mPa·s, more preferably from 100 to 30,000 mPa·s, particularly preferably from 200 to 20,000 mPa·s, at 25° C. If they are within these ranges, unevenness on the surface of the resin particle (A) is easy to form.

The temperature when the resin (a) and/or the precursor (a0) is dispersed in an aqueous medium is preferably from 0 to 150° C., more preferably from 5 to 98° C., particularly preferably from 10 to 60° C. If the temperature exceeds 100° C., it indicates a temperature under pressurized conditions.

The dispersing apparatus when the resin (a) and/or the precursor (a0) of the resin, the filler (b) and, or solvent solutions of these are dispersed in an aqueous medium is not particularly limited, and examples of the apparatus include batch emulsifiers such as a homogenizer (manufactured by IKA Japan K.K.), Polytron (manufactured by Kinematica), and TK Auto Homomixer (manufactured by Tokushu Kika Kogyo Co., Ltd.), continuous emulsifiers such as Ebara Milder (manufactured by Ebara Corporation), TK Fillmix and TK Pipe Line Homomixer (manufactured by Tokushu Kika Kogyo Co., Ltd.), Colloid Mill (manufactured by Shinko Pantech Co., Ltd.), a slasher and Trigonal wet pulverizer (manufactured by Mitsui Miike Machinery Co., Ltd.), Cabitron (manufactured by Eurotech, Ltd.), and Fine Flow Mill (manufactured by Pacific Machinery & Engineering Co., Ltd.), high-pressure emulsifiers such as Microfluidizer (manufactured by Mizuho Kogyo Co., Ltd.), Nanomizer (manufactured by Nanomizer), and APV Gaulin (manufactured by Gaulin) membrane emulsifiers such as a membrane emulsifier (manufactured by REICA), vibration emulsifiers such as Vibro Mixer (manufactured by REICA), and ultrasonic emulsifiers such as an ultrasonic homogenizer (manufactured by BRANSON). Of these, from a view point of uniformity of particle size, APV Gaulin, a homogenizer, TK Auto Homomixer, Ebara Milder, TK Fillmix and TK Pipe Line Homomixer are preferable.

In the present invention, for the formation of the outer shell layer (S) on the resin particle (A), at least a portion of the filler (b) is preferably finely dispersed within the oil drop (A0) to increase the dispersion coefficient of the filler (b) because the filler (b) needs to be dispersed onto the surface of the oil drop (A0) from the inside thereof. The method of dispersing at least a portion of the filler (b) is not particularly limited, well-known methods can be applied. For instance, the following the methods [1] to [6] and the methods combining these, and the like can be applied.

[1] A method that involves melt kneading the resin (a) and the filler (b), as necessary, in the presence of the solvent (s) and/or a dispersing agent by means of a kneader, obtaining the master batch (m) in which the filler (b) is dispersed in the resin (a), and dispersing the resulting material in the solvent (s).

[2] A method that involves dissolving or suspending the filler (b), as required, together with the resin (a) and/or the precursor (a0) of the resin (a) in the solvent (s), precipitating the particles in the liquid via cooling crystallization, solvent crystallization or the like.

[3] A method that involves dissolving or suspending the filler (b), as required, together with the resin (a) and/or the precursor (a0) of the resin (a) in the solvent (s), precipitating the particles in the gas phase via spray drying or the like, and subsequently mixing and dispersing the precipitate in the solvent (s).

[4] A method that involves dissolving or suspending the filler (b), as required, together with the resin (a) and/or the precursor (a0) of the resin (a) in the solvent (s), mechanically wet pulverizing or shredding the resulting material with a disperser.

[5] A method that involves adding and mixing the filler (b) synthesized in the solvent (s).

[6] A method that involves adding to the dispersion liquid (D0) an organosol prepared by wet-treating the filler (b) dispersing in water by a surface treating agent (d) and subjecting to solvent replacement.

The kneaders used in the method [1] above include batch kneaders such as a roll mill and a universal mixer, a single or twin screw extruding kneader, continuous kneaders such as a twin roll type kneader and a triple roll type kneader.

Examples of the method [2] above include a method of heat dissolving the filler (b) in a solvent, and then cooling the resulting solution to crystallize the particles of the filler (b), or a method of dissolving the filler (b) in a good solvent, and then adding the resulting solution to a poor solvent to crystallize the particles of the filler (b). In these methods, a batch operation may be carried out by an agitation reaction vessel, a universal mixer, or the like, or a continuous operation may be performed by the above high-pressure emulsifiers, which are used for obtaining an aqueous dispersion containing resin particles (A), such as APV Gaulin, Nanomizer and a high-pressure homogenizer.

Examples of the method [3] above include a method that involves heat dissolving the filler (b) in a solvent, crystallizing the particles of the filler (b) in the gas phase by spray drying or the like, and dispersing the resulting particles in the solvent (s) by means of a disperser illustrated in the above method [2].

The dispersers used in the method [4] above can utilize media dispersers (i.e., beads mills) such as Dinomill (manufactured by Shinmaru Enterprises Corp.), Ultra-viscomill (manufactured by Imex Corp.) and Puremill (manufactured by Asada Iron Works Co., Ltd.), in addition to the above emulsifiers used for obtaining an aqueous dispersion containing resin particles (A). Of these, preferred are Cabitron, Ebara Milder, Colloid Mill, Dinomill, Ultra-viscomill, and Puremill, from the view points of grindability and shredding properties of the filler (b).

Examples of the method [5] above include a method that involves adding as the filler (b) organic fine particles synthesized by dispersion polymerization or precipitation polymerization in a solvent.

Examples of organosols of the filler (b) synthesized by a wet method in the method [6] above include a hydrogel of a metal oxide synthesized by a hydrothermal synthesis method, a sol-gel method, or the like, and an organosol obtained by the method that involves hydrophobing a dispersion liquid of organic fine particles obtained by emulsification polymerization, seed polymerization, suspension polymerization or the like, by means of the above surface treating agent (d), and replacing the water by the solvent (s) (preferably, methylethylketone, ethyl acetate, or the like). Commercially available organosols prepared by the above method (examples include organosilicasols [MEK-ST, MEK-ST-UP, and the like] manufactured by Nissan Chemical Industries, Ltd.) may also be used.

From the viewpoint of dispersion stability, particularly the methods of [1], [4], [5] and [6] are preferable.

The content of the solvent (s) in the filler-containing dispersion liquid (D) is preferably from 20 to 80%, more preferably from 30 to 75%, particularly preferably from 40 to 70%. For the deformation of the shape of the resin particle (A), the resin particle (A) needs to be volume-shrunk, thus the content of the solvent (s) in the (D) is preferably 20% or more.

The method of removing a solvent is not particularly limited, and well-known methods are applicable; examples of the method that are applicable include the methods [1] to [3] below, combination methods thereof, and the like.

[1] A method of removing a solvent via heating and/or pressure reduction in a generally employed vessel for solvent removal by agitation, film evaporator or the like.
[2] A method of performing air blowing on the surface of a solution, or in a solution to remove a solvent.
[3] A method of diluting a suspension of the filler-containing dispersion liquid (D) and the aqueous medium (W) in water, and extracting the solvent (s) in the continuous water phase.

In the method of [1], it is preferable that the temperature in heating is a melting point (Tm) or below if the resin (a) is crystalline; if the resin (a) is non-crystalline, the temperature is the glass transition temperature (Tg) or below; the temperature is normally preferably 5° C. or less lower than Tm or Tg, more preferably 10° C. or less, particularly preferably 20° C. or less. The pressure reduction degree (i.e., gauge pressure) in pressure reduction is preferably −0.03 MPa or less, more preferably −0.05 MPa or less.

The method of [3] is a preferable method when the solvent (s) has solubility to water. In general, the method of [1] is preferable.

When the speed of removing solvent is large, as the solvent of the surface of the resin particle (A) is rapidly solvent-removed, so the viscosity difference between the inside and the surface of the resin particle (A) becomes large, which in turn remarkably indicates unevenness of the surface of the resin particle (A), thereby making the shape factor (SF-2) large. Accordingly, the selection of a method that involves a larger solvent-removing speed can reduce the amount of addition of the filler (b).

The methods of removing an aqueous medium from the aqueous dispersion containing resin particles (A) that are applicable include the methods [1] to [3] below, the combinations thereof, and the like.

[1] A method of drying the aqueous medium under reduced pressure or normal pressure.
[2] A method of carrying out solid-liquid separation by means of a centrifuge, a sparkler filter and/or a filter press, adding as necessary, water or the like thereto and repeating solid-liquid separation, and then drying the obtained solid.
[3] A method of freezing an aqueous dispersion for drying (so-called freeze drying).

In the methods of [1] and [2] above, drying can be carried out by using well-known equipments such as a fluidized-bed dryer, a vacuum dryer, or a circulation air dryer.

In addition, as appropriate, classification is performed by means of an air shift spreading machine, a sieve, or the like, and a specified particle size distribution can be obtained.

The resin particle (A) of the present invention has a volume average particle diameter of from 0.1 to 300 μm, has the outer shell layer (S) of the filler (b*) adjacent to the surface of the resin particle (A) having a thickness of 0.01 μm or more and ½ or less of the radius of the inscribed circle of the resin particle (A), and further has a shape factor (SF-2) of from 110 to 300. This provides a toner good in blade cleaning properties, low-temperature fixing properties, and anti-hot offset properties. Moreover, the resin particle is excellent in masking properties and oil absorbance, and is suitable for a paint additive, a cosmetics additive, a paper coating additive, an abrasive, a slush molding material, a hot melt adhesive, a powder paint, other molding materials, and the like.

EXAMPLES

The present invention will be further set forth in terms of Examples hereinafter, but the invention is by no means limited thereto.

Production Example 1

Into a reaction vessel equipped with an agitation device and dehydrating device were placed 218 parts of a bisphenol A•EO (2 mol) adduct, 537 parts of a bisphenol A•PO (3 mol) adduct, 213 parts of terephthalic acid, 47 parts of adipic acid, and 2 parts of dibutyltin oxide, and a dehydration reaction was carried out under normal pressure at 230° C. for 5 hours, and then a dehydration reaction was performed under a reduced pressure of 3 mmHg for 5 hours. After cooling to 180° C., and 43 parts of trimellitic anhydride was placed thereto, and then a reaction was carried out under normal pressure for 2 hours to yield [ester resin 1]. [Ester resin 1] had a Tg of 44° C., a number average molecular weight of 2700, a weight average molecular weight of 6500, and an acid value of 25.

Production Example 2

Into a reaction vessel equipped with an agitation device and dehydrating device were placed 681 parts of a bisphenol A•EO (2 mol) adduct, 81 parts of a bisphenol A•PO (2 mol) adduct, 275 parts of terephthalic acid, 7 parts of adipic acid, 22 parts of trimellitic anhydride and 2 parts of dibutyltin oxide, and a dehydration reaction was carried out under normal pressure at 230° C. for 5 hours, and then a dehydration reaction was performed under a reduced pressure of 3 mmHg for 5 hours to obtain [ester resin 2]. [Ester resin 2] had a Tg of 54° C., a number average molecular weight of 2200, a weight average molecular weight of 9500, an acid value of 0.8 and a hydroxyl value of 53.

Production Example 3

Into an autoclave were placed 407 parts of [ester resin 2] obtained in Production Example 2, 108 parts of IPDI and 485 parts of ethyl acetate, and a reaction was carried out in a sealed condition at 100° C. for 5 hours to obtain [prepolymer solution 1] having an isocyante group at the terminal of the molecule. The NCO content of [prepolymer solution 1] was 1.7%.

Production Example 4

Into a reaction vessel equipped with an agitation device, solvent-removing device and thermometer were placed 50 parts of isophoronediamine and 300 parts of methyl ethyl ketone, and a reaction was carried out at 50° C. for 5 hours, and then the resulting material was subjected to solvent removal to obtain [curing agent 1], a ketimine compound. The total amine value of [curing agent 1] was 415.

Production Example 5

Into a reaction vessel fitted with a stirring rod and thermometer were placed 683 parts of water, 11 parts of a sodium salt of a sulfate ester of methacrylic acid ethylene oxide adduct (Eleminol RS-30, manufactured by Sanyo Chemical Industries Ltd.), 139 parts of styrene, 138 parts of methacrylic acid, 184 parts of butyl acrylate, and 1 part of ammonium persulfate, and the resulting material was stirred at 400 revolutions per minute for 15 minutes to obtain a white emulsion. The emulsion was heated to a system temperature of 75° C. and then reacted for 5 hours. Further, thereto was added 30 parts of a 1% aqueous ammonium persulfate solution and the resulting mixture was matured at 75° C. for 5 hours to obtain an aqueous dispersion [fine particle dispersion liquid 1] of a vinyl resin (a copolymer of styrene-methacrylic acid-butyl methacrylate-a sodium salt of a sulfate ester of methacrylic acid EO adduct). The volume average particle diameter of [fine particle dispersion liquid 1] as determined by LA-920 was 0.15 µm.

Production Example 6

Into a vessel fitted with a stirring rod were placed 955 parts of water, 15 parts of [fine particle dispersion liquid 1] obtained from Production Example 5, and 30 parts of an aqueous solution of dodecyldiphenyl ether sodium disulfonate (Eleminol MON 7, manufactured by Sanyo Chemical Industries Ltd.) to obtain an opaque white liquid [water phase 1].

Production Example 7

[Water phase 2] was obtained as in <Production Example 6> with the exception that 15 parts of [fine particle dispersion liquid 1] was not added.

Production Example 8

300 Parts of [ester resin 1] obtained in Production Example 1, 500 parts of copper phthalocyanine 15:3 (C. I. Pigment Blue 15:3) (mean primary particle diameter 25 nm) 150 parts of ester based pigment dispersing agent (Solsperse 24000SC, manufactured by Avecia Ltd.) and 50 parts of a phthalocyanine pigment derivative (Solsperse 5000, manufactured by Avecia Ltd.) were admixed with a Henschel mixer, and the resulting mixture was kneaded by means of a twin screw extruding kneader to obtain [master batch 1].

Production Example 9

150 Parts of [ester resin 1] obtained in Production Example 1, 50 parts of hydrophobic silica (Aerosil R974, mean primary particle diameter 12 nm, manufactured by Nippon Aerosil Co., Ltd.), 5 parts of bis(2-morphorinoethyl) ether, and 478 parts of ethyl acetate were admixed in an agitation mixing bath, and then the resulting mixture was wet dispersed by an Ultra-viscomill (manufactured by Imex Corp.) to obtain [silica dispersion liquid 1].

Production Example 10

To a reaction vessel fitted with a stirring rod and thermometer were added 50 parts of carnauba wax, 150 parts of [ester resin 1] and 470 parts of ethyl acetate, and the resulting material was heated to 70° C. to melt the carnauba wax, and then cooled to 30° C. to crystallize the wax, thereby obtaining [wax dispersion liquid 1]. Further, [wax dispersion liquid 1] was wet dispersed by Ultra-viscomill (manufactured by Imex Corp.) to obtain [wax dispersion liquid 2]. The solid content of [wax dispersion liquid 2] was 30%.

Production Example 11

Into an autoclave fitted with a stirring rod and thermometer was placed 24 parts of xylene, and thereto were added dropwise at 170° C. over 3 hours 2000 parts of a mixture of monomers of glycidyl methacrylate/methyl methacrylate/ styrene/2-ethylhexyl acrylate (25% by weight/33% by weight/40% by weight/2% by weight) and 1 part of a polymerization catalyst and polymerized. The solution was gas removed at normal pressure while being temperature increased to 180° C., and the operation was switched to pressure reduction upon 180° C., and then gas removal was performed under reduced pressure over two hours to obtain [vinyl resin 1]. [Vinyl resin 1] had a number average molecular weight of 10,500, a weight average molecular weight of 120,000 and a glass transition temperature of 65° C.

Production Example 12

500 Parts of [ester resin 1] obtained in Production Example 1, and 500 parts of copper phthalocyanine 15:3 (C. I. Pigment Blue 15;3; mean primary particle diameter 25 nm) were admixed by means of Henschel mixer, and the resulting mixture was kneaded using a twin screw extruding kneader to obtain [master batch 2].

Comparative Production Example 1

[Silica dispersion liquid 2] was obtained as in Production Example 9 with the exception that bis(2-morphorinoethyl) ether was not added.

Example 1

Into a beaker were placed 291 parts of [ester resin 1], 325 parts of [wax dispersion liquid 2], 213 parts of ethyl acetate, 119 parts of [prepolymer solution 1], 13 parts of [curing agent 1] and 39 parts of [master batch 1], and the resulting material was dissolved, admixed and homogenized, and then 1500 parts of [water phase 1] was added thereto. The resulting material was dispersed at 25° C. for one minute using a TK Homomixer (manufactured by Tokushu Kika Kogyo Co., Ltd.) at a revolution number of 12000 rpm and further the solvent was removed using a film evaporator under conditions of a pressure reduction degree of −0.05 MPa (gauge pressure), a temperature of 40° C. and a revolution number of 100 rpm, for 30 minutes, to obtain an aqueous dispersion (D1).

100 Parts of the aqueous dispersion (D1) was centrifuged and further 60 parts of water was added thereto and then centrifuged. The step of the solid-liquid separation was repeated twice and the resulting material was dried at 35° C. for one hour to obtain a resin particle (P1). The characteristic values of (P1) are indicated in Table 1.

Example 2

Into a beaker were placed 271 parts of [ester resin 1], 330 parts of [wax dispersion liquid 2], 39 parts of [master batch 2], 142 parts of ethyl acetate, 116 parts of [prepolymer 1], 13 parts of [curing agent 1] and 86 parts of organosilica sol (MEK-ST-UP, solid content 20%, mean primary particle diameter 15 nm; manufactured by Nissan Chemical Industries, Ltd.), and the resulting material was dissolved, admixed and homogenized, and then 1500 parts of [water phase 1] was added thereto. The resulting material was dispersed at 25° C. for one minute using a TK Homomixer at a revolution number of 12000 rpm and further the solvent was removed using a film evaporator under conditions of a pressure reduction degree of −0.05 MPa (gauge pressure), a temperature of 40° C. and a revolution number of 100 rpm, for 30 minutes, to obtain an aqueous dispersion (D2).

Figure 2:
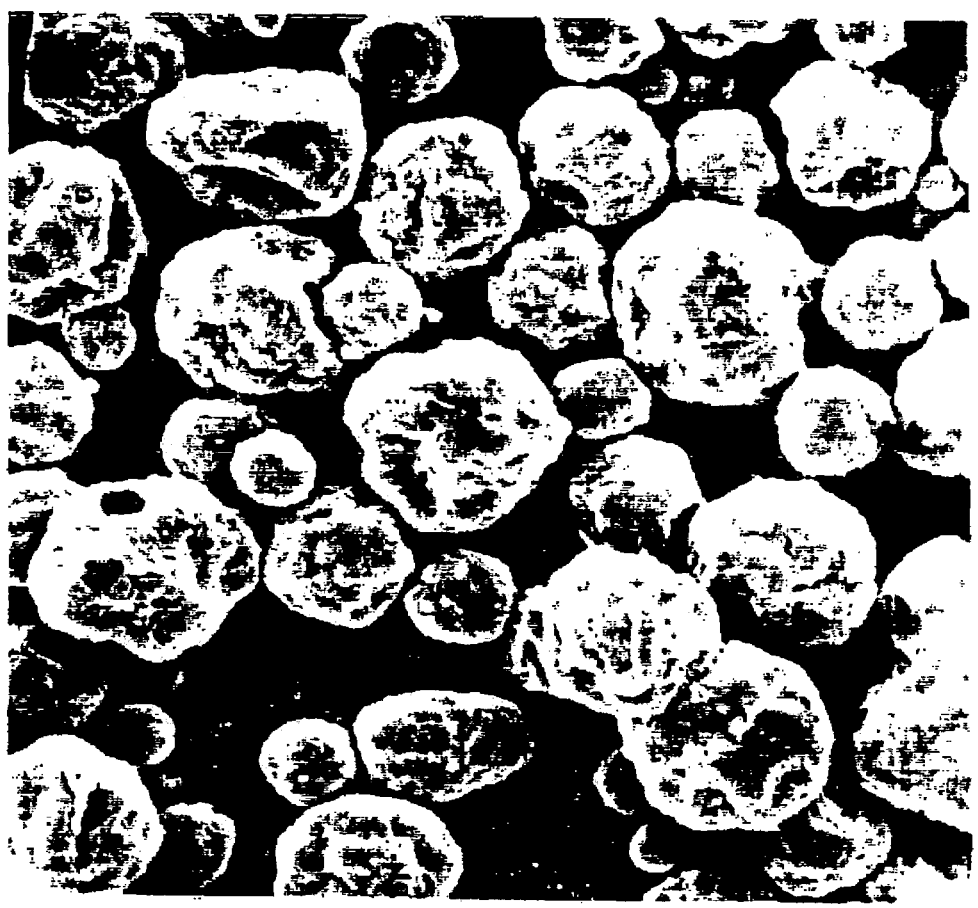
FIG. 2 is an SEM image of resin particles obtained in Example 2.
Figure 3:
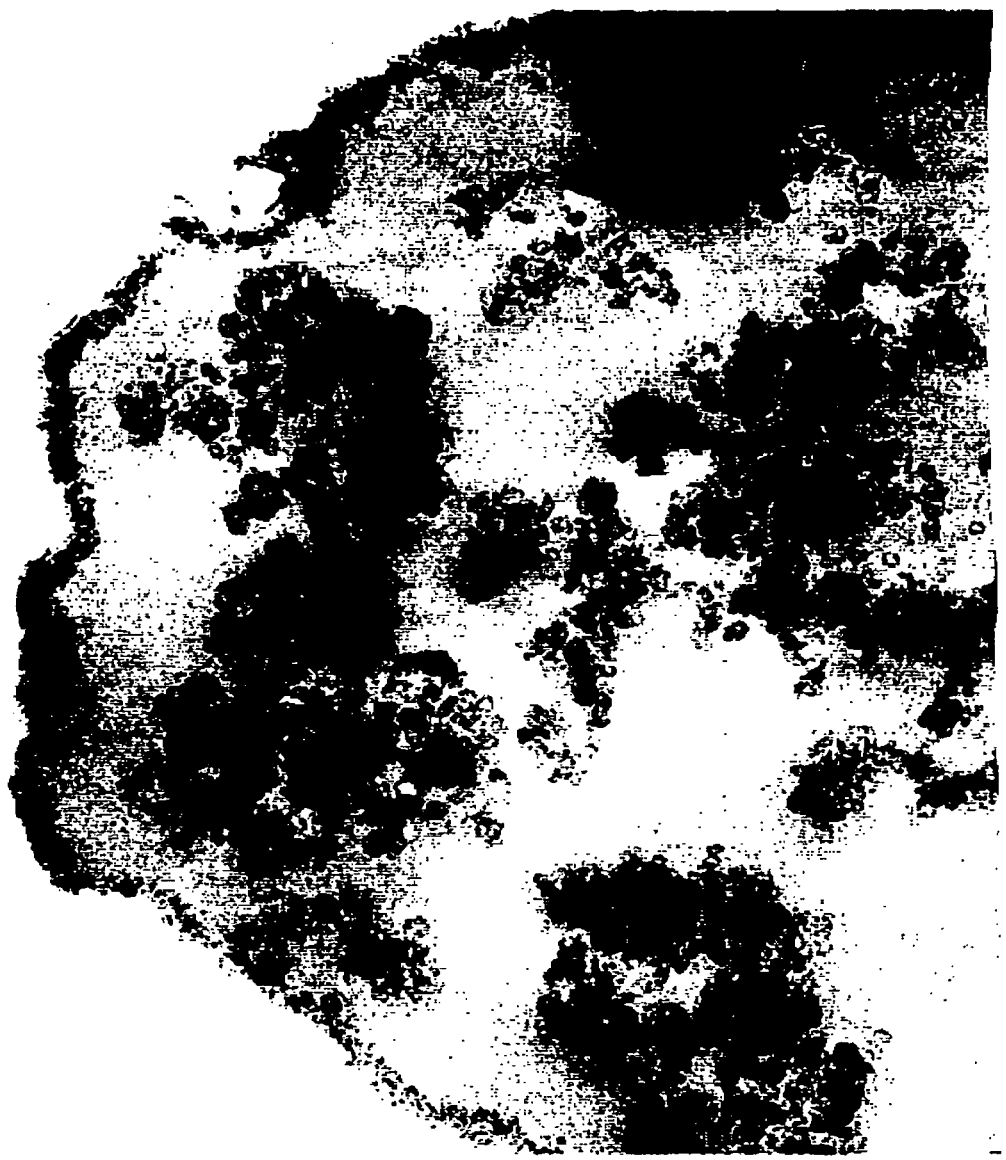
FIG. 3 is a TEM image of a resin particle obtained in Example 2.

100 Parts of (D2) was centrifuged and further 60 parts of water was added thereto and then centrifuged. The step of the solid-liquid separation was repeated twice and the resulting material was dried at 35° C. for one hour to obtain a resin particle (P2). The characteristic values of (P2) were indicated in Table 1, a SEM image in FIG. 2, and a TEM image in FIG. 3. Silica alone was accumulated on the surface to form the outer shell layer (in FIG. 3, the condition is judged from the appearance of the particle contour portion being a dark belt shape.), whereby the appearance of the resin particle surface being deformed unevenly (in FIG. 2, the appearance is seen from the particle looking like a "umeboshi (pickled plum) shape." which means a plum having uneven surface due to dehydration-shrinkage.) was observed.

Example 3

In <Example 2> above, 115 parts of MEK-ST (solid content 30%, mean primary particle diameter 15 nm; manufactured by Nissan Chemical Industries, Ltd.) in place of 86 parts of MEK-ST-UP was changed, and an aqueous dispersion (D3) and a resin particle (P3) were obtained in a similar manner. The characteristic values of (P3) were shown in Table 1.

Example 4

Into a beaker were placed 223 parts of [ester resin 1], 324 parts of [wax dispersion liquid 2], 39 parts of [master batch 2], 54 parts of ethyl acetate, 114 parts of [prepolymer 1], 13 parts of [curing agent 1] and 231 parts of [silica dispersion liquid 1], and the resulting material was dissolved, admixed and homogenized, and then 1500 parts of [water phase 1] was added thereto. The resulting material was dispersed at 25° C. for one minute using a TK Homomixer at a revolution number of 12000 rpm and further the solvent was removed using a film evaporator under conditions of a pressure reduction degree of −0.05 MPa (gauge pressure), a temperature of 40° C. and a revolution number of 100 rpm, for 30 minutes, to obtain an aqueous dispersion (D4).

100 Parts of (D4) was centrifuged and further 60 parts of water was added thereto and then centrifuged. The step of the solid-liquid separation was repeated twice and the resulting material was dried at 35° C. for one hour to obtain a resin particle (P4). The characteristic values of (P4) were indicated in Table 1.

Example 5

In <Example 4> above, [ester resin 1] was changed to [vinyl resin 1], and an aqueous dispersion (D5) and a resin particle (P5) were obtained in a similar manner. The characteristic values of (P5) were shown in Table 1.

Comparative Example 1

Figure 4:
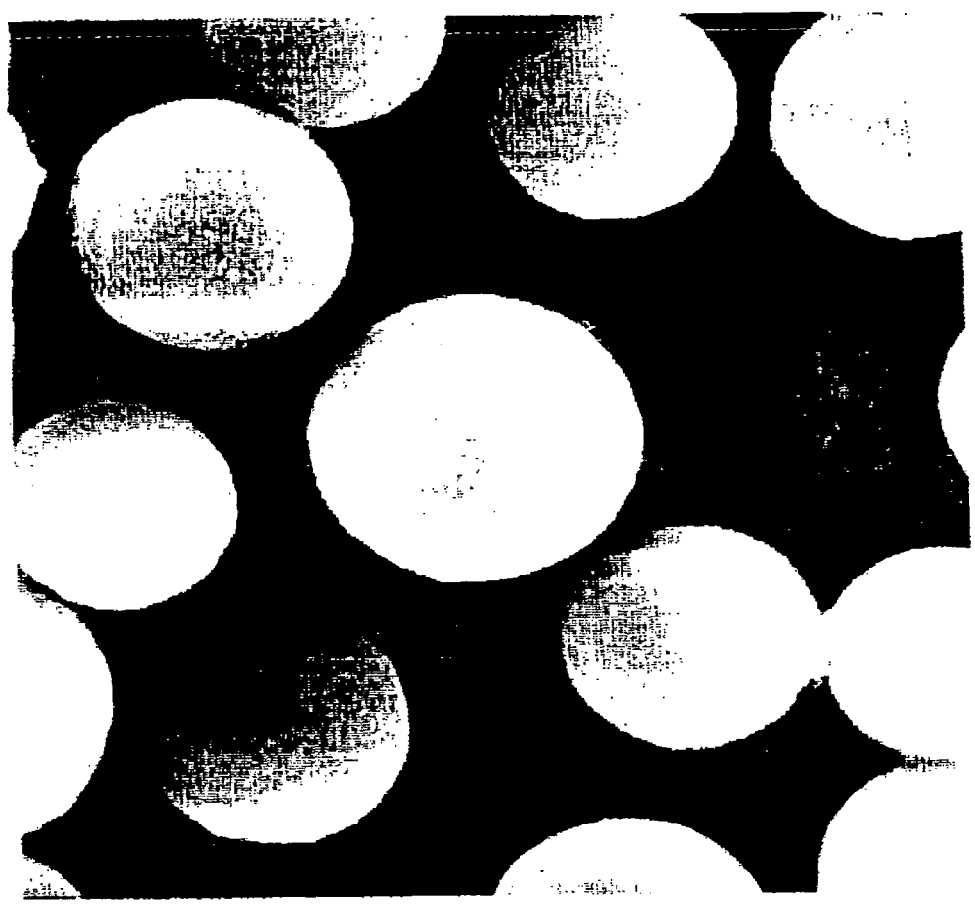
FIG. 4 is an SEM image of resin particles obtained in Comparative Example 1.

An aqueous dispersion (CD1) and a resin particle (CP1) were obtained as in Example 2 with the exception that the organosilica sol was not added. The characteristic values of (CP1) were indicated in Table 1, and a SEM image was indicated in FIG. 4. FIG. 4 shows that (CP1) is a true spherical particle.

Comparative Example 2

In <Example 5> above, [silica dispersion liquid 2] was used in place of [silica dispersion liquid 1], and an aqueous dispersion (CD2) and a resin particle (CP2) were obtained in a similar manner. The characteristic values of (CP2) were shown in Table 1.

Comparative Example 3

An aqueous dispersion (CD3) and a resin particle (CP3) were obtained as in <Example 1>, with the exception that

[master batch 2] was used in place of [master batch 1]. The characteristic values of (CP3) were shown in Table 1.

To the resin particles (P1) to (P5) and (CP1) to (CP3) obtained in Examples and Comparative Examples above, 1 part of hydrophobic silica particles based on 100 parts of resin particles are added, and the resulting materials were admixed by means of a Henschel mixer to obtain respective toners (T1) to (T5) and (CT1) to (CT3).

Developers were prepared that comprise 5% of the toners obtained above and 95% of copper-zinc ferrite carriers having an average particle diameter of 40 µm, coated with silicone resin, and paper sheets of an A4 size were continuously printed by means of imagio Neo 450 manufactured by Ricoh, which can print the 45 paper sheets per minute, and evaluated according to the criteria below. The results were shown in Table 1.

(a) Fixing Properties

The amount of a toner was adjusted such that a toner of $1.0 \pm 0.1$ mg/cm$^2$ was developed on transfer paper (Type 6200, manufactured by Ricoh) with a solid image, and the adjustment was performed such that the temperature of the fixing belt was changeable, and then the minimum and maximum temperature values that did not cause offset were determined. In addition, the fixing roll temperature in which the residue percentage of the image density after the fixed image thus obtained was rubbed with a pad was 70% or more was defined as the lower limit of fixing temperature.

(b) Cleaning Properties

A remaining toner after transfer on a photoreceptor that passed through the cleaning step was moved to a white paper sheet with Scotch tape (manufactured by 3M Japan); the sheet density was determined by means of a Macbeth Reflection Densitometer RD514 Model. A toner having a density of 0.01 or less relative to the blank density was determined to be ○ (good) and a toner of a density exceeding the value was determined to be x (no good). The evaluation was carried out after 5000 sheets were printed.

Example 6

Into a beaker were placed 365 parts of [ester resin 1], 426 parts of ethyl acetate, 147 parts of [prepolymer solution 1], 16 parts of [curing agent 1] and 45 parts of [master batch 1], and the resulting material was dissolved, admixed and homogenized, and then 1500 parts of [water phase 1] was added thereto. The resulting material was dispersed at 25° C. for one minute using a TK Homomixer (manufactured by Tokushu Kika Kogyo Co., Ltd.) at a revolution number of 12000 rpm and further the solvent was removed using a film evaporator under conditions of a pressure reduction degree of −0.05 MPa (gauge pressure), a temperature of 40° C. and a revolution number of 100 rpm, for 30 minutes, to obtain an aqueous dispersion (D6).

100 Parts of (D6) was centrifuged and further 60 parts of water was added thereto and then centrifuged. The step of the solid-liquid separation was repeated twice and the resulting material was dried at 35° C. for one hour to obtain a resin particle (P6). The characteristic values of (P6) were indicated in Table 2.

Example 7

Into a beaker were placed 388 parts of [ester resin 1], 344 parts of ethyl acetate, 151 parts of [prepolymer 1], 17 parts of [curing agent 1] and 101 parts of organosilica sol (MEK-ST-UP, solid content 20%; manufactured by Nissan Chemical Industries, Ltd.), and the resulting material was dissolved, admixed and homogenized, and then 1500 parts of [water phase 1] was added thereto. The resulting material was dispersed at 25° C. for one minute using a TK Homomixer at a revolution number of 12000 rpm and further the solvent was removed using a film evaporator under conditions of a pressure reduction degree of −0.05 MPa (gauge pressure), a temperature of 40° C. and a revolution number of 100 rpm, for 30 minutes, to obtain an aqueous dispersion (D7). 100 Parts of (D7) was centrifuged and further 60 parts of water was added

TABLE 1

Figure 5:
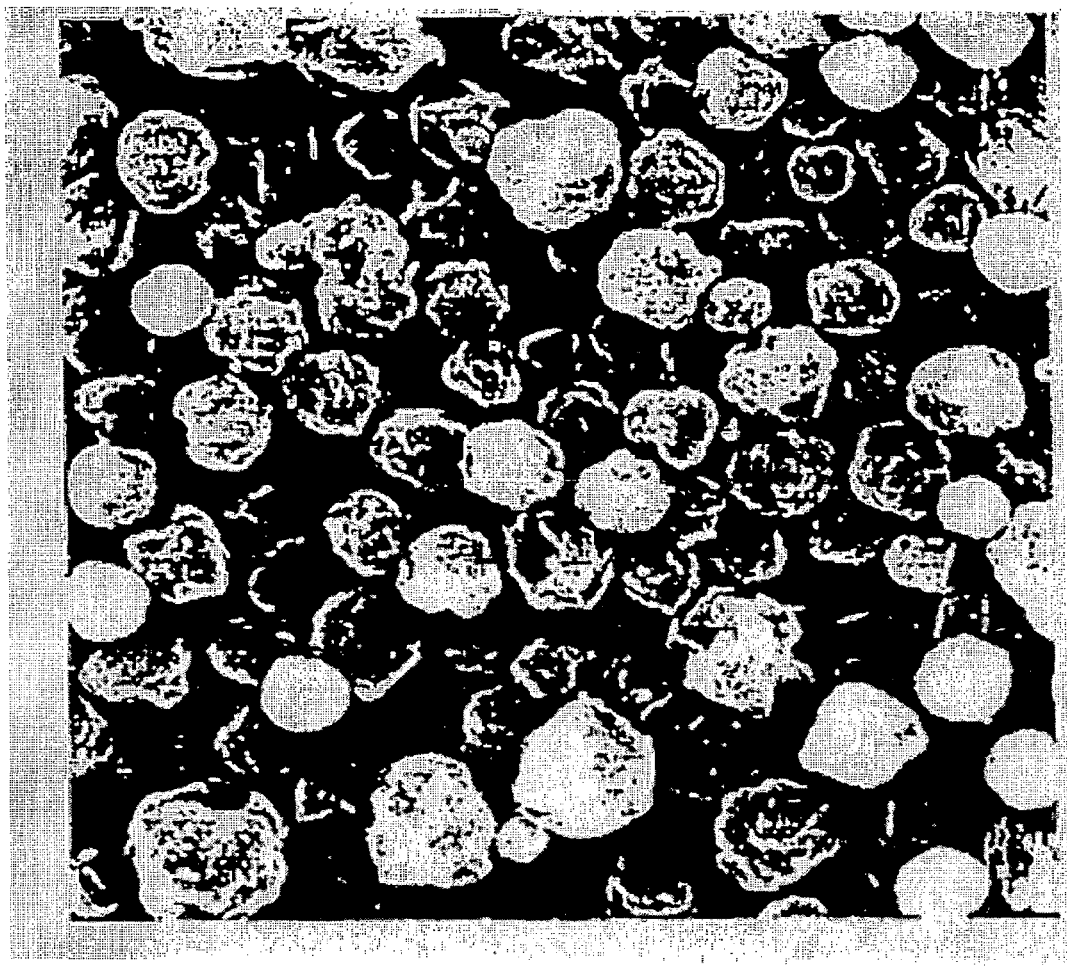
FIG. 5 is an SEM image of resin particles obtained in Example 7.
Figure 6:
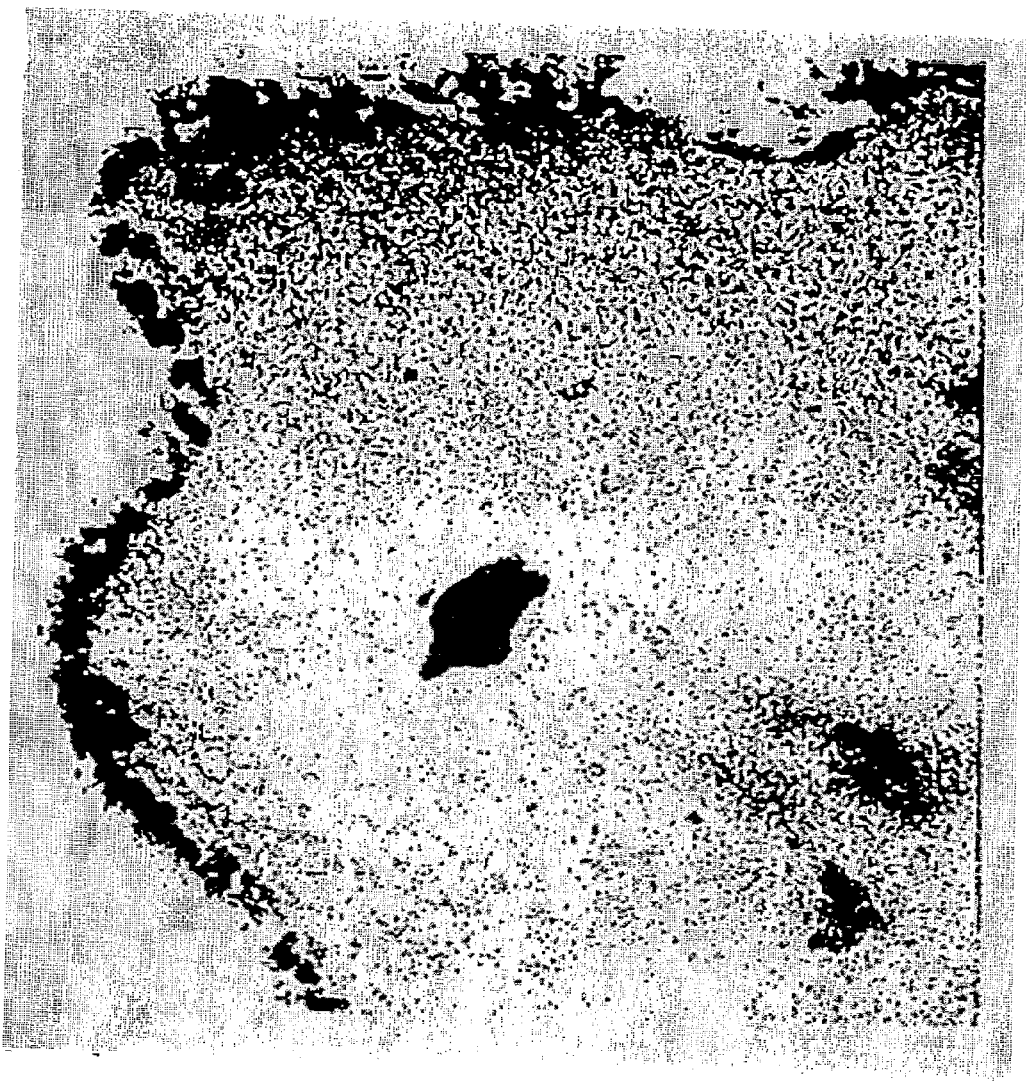
FIG. 6 is a TEM image of a resin particle obtained in Example 7.

| | Example | | | | | Comparative Example | | |
|---|---|---|---|---|---|---|---|---|
| | 1 | 2 | 3 | 4 | 5 | 1 | 2 | 3 |
| Resin particle (A) | P1 | P2 | P3 | P4 | P5 | CP1 | CP2 | CP3 |
| Toner | T1 | T2 | T3 | T4 | T5 | CT1 | CT2 | CT3 |
| Kind of filler (b*) | C.I. Pigment Blue 15:3 | MEK-ST-UP | MEK-ST | Aerosil R974 | Aerosil R974 | None | Aerosil R974 | C.I. Pigment Blue 15:3 |
| Content [wt %] of filler (b*) in resin particle (A) | 4 | 3.5 | 7 | 3.5 | 3.5 | 0 | 3.5 | 4 |
| Volume average particle diameter [µm] of resin particle (A) | 4.6 | 5.3 | 5.1 | 5.3 | 5.5 | 5.2 | 5.5 | 5.4 |
| Dv/Dn of resin particle (A) | 1.21 | 1.13 | 1.15 | 1.22 | 1.14 | 1.11 | 1.13 | 1.14 |
| Thickness [µm] of outer shell layer (S) | 0.05 | 0.03 | 0.03 | 0.02 | 0.03 | 0 | 0 | 0 |
| Shape factor (SF-2) of resin particle (A) | 132 | 137 | 136 | 135 | 134 | 102 | 105 | 108 |
| Center line average surface roughness [µm] of resin particle (A) | 0.3 | 0.1 | 0.1 | 0.1 | 0.1 | 0 | 0 | 0 |
| Blade cleaning properties | ○ | ○ | ○ | ○ | ○ | x | x | x |
| Lower limit of fixing temperature [° C.] | 135 | 140 | 135 | 140 | 150 | 135 | 140 | 135 |
| Upper limit of fixing temperature [° C.] | >210 | >210 | >210 | >210 | >210 | >210 | >210 | >210 | thereto and then centrifuged. The step of the solid-liquid separation was repeated twice and the resulting material was dried at 35° C. for one hour to obtain a resin particle (P7). The characteristic values of (P7) were indicated in Table 2, a SEM image in FIG. 5, and a TEM image in FIG. 6. Silica alone was accumulated on the surface to form the outer shell layer (in FIG. 6, the condition is judged from the appearance of the particle contour portion being a dark belt shape.), whereby the appearance of the resin particle surface being deformed unevenly (in FIG. 5, the appearance is seen from the particle looking like a "umeboshi (pickled plum) shape." which means a plum having uneven surface due to dehydration-shrinkage.) was observed.

Example 8

In <Example 7> above, 135 parts of MEK-ST (solid content 30%; manufactured by Nissan Chemical Industries, Ltd.) was employed in place of 67 parts of MEK-ST-UP (manufactured by Nissan Chemical Industries, Ltd.), and an aqueous dispersion (D8) and a resin particle (P8) were obtained in a similar manner. The characteristic values of (P8) were shown in Table 2.

Example 9

Into a beaker were placed 323 parts of [ester resin 1], 233 parts of ethyl acetate, 149 parts of [prepolymer 1], 17 parts of [curing agent 1] and 276 parts of [silica dispersion liquid 1], and the resulting material was dissolved, admixed and homogenized, and then 1500 parts of [water phase 1] was added thereto. The resulting material was dispersed at 25° C. for one minute using a TK Homomixer at a revolution number of 12000 rpm and further the solvent was removed using a film evaporator under conditions of a pressure reduction degree of –0.05 MPa (gauge pressure), a temperature of 40° C. and a revolution number of 100 rpm, for 30 minutes, to obtain an aqueous dispersion (D9). 100 Parts of (D9) was centrifuged and further 60 parts of water was added thereto and then centrifuged. The step of the solid-liquid separation was repeated twice and the resulting material was dried at 35° C. for one hour to obtain a resin particle (P9). The characteristic values of (P9) were indicated in Table 2.

Example 10

Into a beaker were placed 483 parts of poly methyl methacrylate (Sumipex-BMHO, manufactured by Sumitomo Chemical Co., Ltd.), 430 parts of ethyl acetate, and 87.5 parts of organosilica sol (MEK-ST-UP, solid content 20%; manufactured by Nissan Chemical Industries, Ltd.), and the resulting material was dissolved, admixed and homogenized, and then 1500 parts of [water phase 2] was added thereto. The resulting material was dispersed at 25° C. for one minute using a TK Homomixer at a revolution number of 12000 rpm and further the solvent was removed using a film evaporator under conditions of a pressure reduction degree of –0.05 MPa (gauge pressure), a temperature of 40° C. and a revolution number of 100 rpm, for 30 minutes, to obtain an aqueous dispersion (D10).

100 Parts of (D10) was centrifuged and further 60 parts of water was added thereto and then centrifuged. The step of the solid-liquid separation was repeated twice and the resulting material was dried at 35° C. for one hour to obtain a resin particle (P10). The characteristic values of (P10) were indicated in Table 2.

Comparative Example 4

Figure 7:
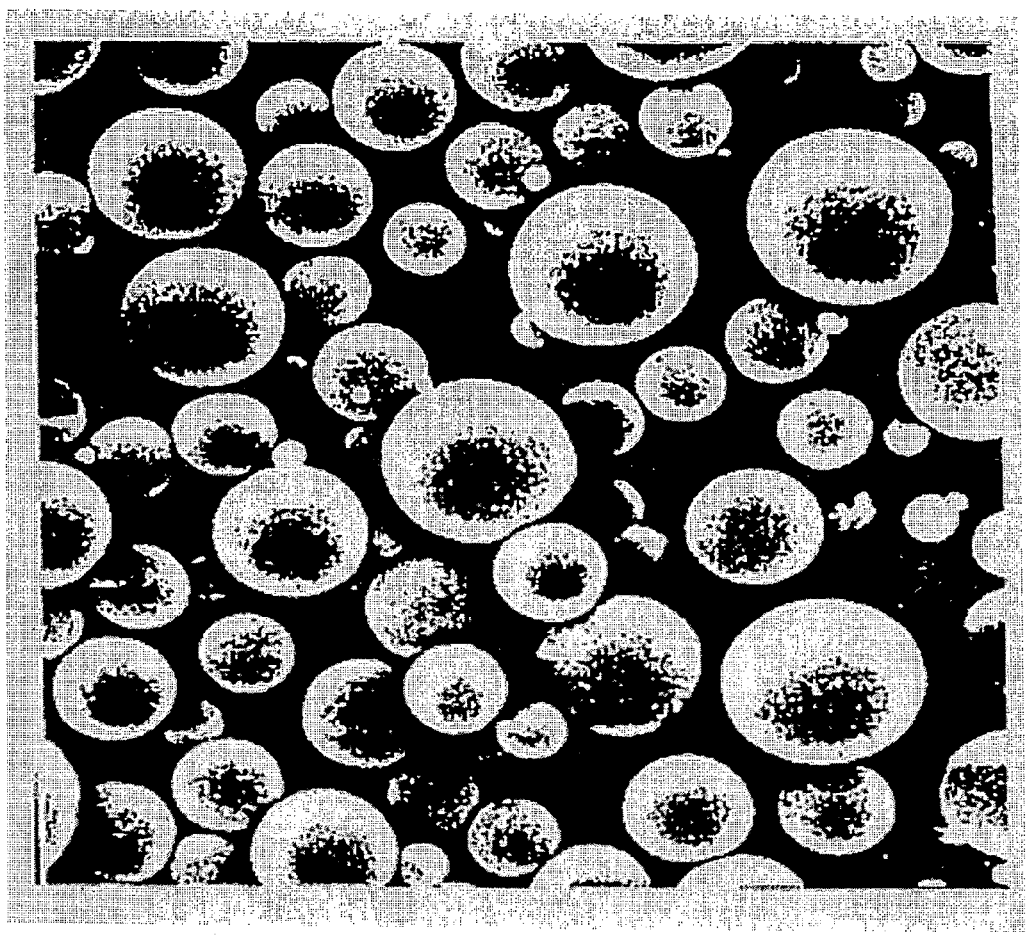
FIG. 7 is an SEM image of resin particles obtained in Comparative Example 4.

An aqueous dispersion (CD4) and a resin particle (CP4) were obtained as in Example 7 with the exception that the organosilica sol was not added. The characteristic values of (CP4) were indicated in Table 2, and a SEM image was indicated in FIG. 7. FIG. 7 shows that (CP4) is a true spherical particle.

Comparative Example 5

In <Example 10> above, [silica dispersion liquid 2] was used in place of [silica dispersion liquid 1], and an aqueous dispersion (CD5) and a resin particle (CP5) were obtained in a similar manner. The characteristic values of (CP5) were shown in Table 2.

Comparative Example 6

An aqueous dispersion (CD6) and a resin particle (CP6) were obtained as in Example 6, with the exception that [master batch 2] was used in place of [master batch 1] in Example 6. The characteristic values of (CP6) were shown in Table 2.

[Masking Rate]

The above resin particles (P6) to (P10) and (CP4 to CP6) are mixed with an acrylic paint [manufactured by Shinto Paint Co., Ltd.: Shinto Acryl #6000] such that the ratio of the solid content of the resin to that of the paint is 1:1. Next, each of these was applied to a black ABS resin plate in such a way that the dried film thickness was 100 μm, and then the resulting plate was dried at 80° C. for 30 minutes. The gloss of the glossiness sample surface was measured using a gloss meter (manufactured by Horiba, Ltd.) at an incidence (light receiving) angle of 60°. In this case, the gloss of a coated film of an acrylic paint, i.e., a binder, is 80%. The masking rate was determined by use of an applicator having a masking rate clearance of 100 μm in accordance with JIS K5400.

TABLE 2

| | Example | | | | | Comparative Example | | |
|---|---|---|---|---|---|---|---|---|
| | 6 | 7 | 8 | 9 | 10 | 4 | 5 | 6 |
| Resin particle (A) | P6 | P7 | P8 | P9 | P10 | CP4 | CP5 | CP6 |
| Kind of filler (b*) | C.I. Pigment Blue 15:3 | MEK-ST-UP | MEK-ST | Aerosil R974 | MEK-ST-UP | None | Aerosil R974 | C.I. Pigment Blue 15:3 |
| Content [wt %] of filler (b*) in resin particle (A) | 4 | 3.5 | 7 | — | 3.5 | 0 | 3.5 | 4 |
| Volume average particle diameter [μm] of resin particle (A) | 4.1 | 3.8 | 5.6 | 8.9 | 23.5 | 4.6 | 7.2 | 4.5 |

TABLE 2-continued

|  | Example | | | | | Comparative Example | | |
| --- | --- | --- | --- | --- | --- | --- | --- | --- |
|  | 6 | 7 | 8 | 9 | 10 | 4 | 5 | 6 |
| Dv/Dn of resin particle (A) | 1.25 | 1.16 | 1.21 | 1.53 | 1.91 | 1.24 | 1.37 | 1.31 |
| Thickness [μm] of outer shell layer (S) | 0.07 | 0.03 | 0.03 | 0.04 | 0.01 | 0 | 0 | 0 |
| Shape factor (SF-2) of resin particle (A) | 154 | 128 | 127 | 124 | 141 | 104 | 108 | 108 |
| Center line average surface roughness [μm] of resin particle (A) | 0.3 | 0.1 | 0.1 | 0.1 | 0.2 | 0 | 0 | 0 |
| Masking rate [%] | 100% | 100% | 100% | 100% | 100% | 85% | 91% | 93% |

INDUSTRIAL APPLICABILITY

As a resin particle of the present invention has the above effects, so is useful as a toner resin, a paint additive, a cosmetics additive, a paper coating additive, a slush molding material, a powder paint, and an abrasive.

The invention claimed is:

1. A resin particle comprising a resin (a) and a filler (b) contained in the particle; characterized in that the particle has a volume average particle diameter of from 0.1 to 300 μm and a shape factor (SF-2) of from 110 to 300, the particle having an outer shell layer (S) comprising at least a portion of the filler (b), the layer (S) having a thickness of at least 0.01 μm and the thickness being ½ or less of the radius of the maximum inscribed circle of the cross section of the particle, wherein a part of the resin (a) is present on the surface of the resin particle.

2. The resin particle according to claim 1, wherein the ratio of the center line average surface roughness to the volume average particle diameter is from 0.001 to 0.1.

3. The resin particle according to claim 1, wherein the ratio of the volume average particle diameter to the number average particle diameter is from 1.0 to 2.0.

4. The resin particle according to claim 1, wherein the resin particle comprises from 0.01 to 50% by mass of the filler (b) and from 0.01 to 20% by mass of the filler (b) constituting the layer (S).

5. The resin particle according to claim 1, wherein the layer (S) comprises a filler (b) a primary particle thereof having a volume average particle diameter of from 0.001 to 3 μm.

6. The resin particle according to claim 5, wherein the ratio of the volume average particle diameter of the primary particle of the filler (b) to the volume average particle diameter of the resin particle is 0.1 or less.

7. The resin particle according to claim 1, wherein the filler (b) comprises an inorganic filler (b1), an organic filler (b2), or the combination of an inorganic filler (b1) and an organic filler (b2), the inorganic filler (b1) being selected from the group consisting of metal oxides, metal hydroxides, metal carbonates, metal sulfates, metal silicates, metal nitrides, metal phosphates, metal borates, metal titanates, metal sulfates, and carbons, the organic filler (b2) being selected from the group consisting of urethane resins, epoxy resins, vinyl resins, ester resins, melamine resins, benzoguanamine resins, fluorine resins, silicone resins, azo pigments, phthalocyanine pigments, condensation polycyclic pigments, coloring lake pigments and organic waxes.

8. The resin particle according to claim 1, wherein the layer (S) comprises the filler (b) treated with a surface treating agent (d) selected from the group consisting of a silane coupling agent, a titanate coupling agent, an aluminate coupling agent, and a tertiary amine compound.

9. The resin particle according to claim 1, wherein the resin (a) is one or more kinds of resins selected from the group consisting of urethane resins, epoxy resins, vinyl resins and ester resins.

10. The resin particle according to claim 1, wherein the resin particle comprises a resin particle (A1) having a particle diameter larger than that of a fine resin particle (A2), at least a portion of the surface of the resin particle (A1) being covered with the layer of the fine resin particle (A2) comprising one or more kinds of resins selected from the group consisting of urethane resins, epoxy resins, vinyl resins and ester resins.

11. The resin particle according to claim 10, wherein at least 5% of the surface of the resin particle (A1) is covered with the fine resin particle (A2).

12. The resin particle according to claim 10, wherein the fine resin particle (A2) has a volume average particle diameter such that the ratio of the volume average particle diameter of the fine resin particle (A2) to the volume average particle diameter of the resin particle (A1) is from 0.001 to 0.3.

13. A process of producing a resin particle (A) of claim 1, comprising:
   (1) dispersing in an aqueous medium (W) a filler-containing dispersion liquid (D) produced by dispersing a filler (b) in a dispersion liquid (D0) comprising a resin (a) and/or its precursor (a0) in a solvent (s), forming an oil-in-water dispersion liquid (D1), thereby forming in an oil drop (A0) an accumulated layer (S0) comprising at least a portion of the filler (b), and
   (2) removing the solvent of the oil-in-water dispersion liquid (D1) to obtain a resin particle (A).

14. The process of production according to claim 13, wherein the content of the solvent (s) in the dispersion liquid (D) is from 20 to 80% by mass.

15. The process of production according to claim 13, wherein the dispersion liquid (D) is obtained by dispersing in the solvent (s) a master batch (m) obtained by melt kneading at least a portion of the resin (a) and the filler (b), as necessary, in the presence of a solvent and/or a dispersing agent.

16. The process of production according to claim 13, wherein the dispersion liquid (D) is obtained by dispersing an organosol of at least a portion of the filler (b) synthesized by a wet method in the dispersion liquid (D0).

17. The process of production according to claim 13, wherein at least a portion of the filler (b) is pulverized or shredded in the solvent (s) in the presence or absence of the resin (a) and/or its precursor (a0).

18. The process of production according to claim 13, wherein the precursor (a0) comprises a prepolymer (a01) having at least one reactive group and a curing agent (a02) reactive to the reactive group.

19. The process of production according to claim 18, wherein the reactive group is selected from the group consisting of an isocyanate group, a blocked isocyanate group and an epoxy group.

20. The process of production according to claim 13, wherein the dispersion solution (D) is dispersed in the aqueous medium (W) containing a fine resin particle (A2) comprising one or more species selected from the group consisting of a urethane resin, an epoxy resin, a vinyl resin and an ester resin.

21. Use of the resin particle of claim 1 as a toner resin, a paint additive, a cosmetics additive, a paper coating additive, a slush molding material, a powder paint, or an abrasive.

* * * * *